(12) United States Patent
Kondo

(10) Patent No.: US 11,953,950 B2
(45) Date of Patent: Apr. 9, 2024

(54) ARTICULATED HINGE DEVICE AND ELECTRONIC DEVICE USING THE SAME

(71) Applicant: KEM HONGKONG LIMITED, Kowloon (HK)

(72) Inventor: Tetsuo Kondo, Kanagawa (JP)

(73) Assignee: KEM HONGKONG LIMITED, Tsimshatsui (HK)

( * ) Notice: Subject to any disclaimer, the term of this patent is extended or adjusted under 35 U.S.C. 154(b) by 0 days.

(21) Appl. No.: 17/839,763

(22) Filed: Jun. 14, 2022

(65) Prior Publication Data

US 2023/0004198 A1 Jan. 5, 2023

(30) Foreign Application Priority Data

Jun. 30, 2021 (JP) .................................. 2021-109206

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .... G06F 1/1681; G06F 1/1652; G06F 1/1616; H05K 5/0213
See application file for complete search history.

(56) References Cited

U.S. PATENT DOCUMENTS

| 9,506,279 B2 * | 11/2016 | Kauhaniemi | ....... H04M 1/0268 |
| 10,070,546 B1 * | 9/2018 | Hsu | ..................... E05D 11/1028 |
| 2005/0268429 A1 * | 12/2005 | Akiyama | ................ G06F 1/162 16/221 |
| 2015/0240544 A1 * | 8/2015 | Nagami | ................. F16M 11/10 16/334 |
| 2017/0227994 A1 * | 8/2017 | Hsu | ....................... G06F 1/1681 |
| 2017/0365197 A1 * | 12/2017 | Kim | ...................... G06F 1/1641 |
| 2018/0059740 A1 * | 3/2018 | Kato | ..................... G06F 1/1681 |
| 2019/0033925 A1 * | 1/2019 | Hong | .................... G06F 1/1681 |
| 2019/0132432 A1 * | 5/2019 | Park | ...................... G06F 1/1681 |
| 2019/0196541 A1 * | 6/2019 | O'Neil | ...................... E05D 1/04 |
| 2019/0212786 A1 * | 7/2019 | Lin | ..................... H04M 1/0216 |

FOREIGN PATENT DOCUMENTS

| JP | 2020-125841 A | 8/2020 | |
| WO | WO-2021051137 A1 * | 3/2021 | ........... G06F 1/1641 |

* cited by examiner

*Primary Examiner* — Rockshana D Chowdhury
*Assistant Examiner* — Martin Antonio Asmat Uceda
(74) *Attorney, Agent, or Firm* — Notaro, Michalos & Zaccaria P.C.

(57) ABSTRACT

An articulated hinge that can hold a folded part of a flexible display sheet that deforms following the opening and closing of the first and second casings, and an electronic gear using this articulated hinge, an articulated hinge couples the first and second casings of an electronic gear in a foldable manner by a relative folding motion between the open and closed positions where an articulated hinge is arranged on the back side of a flexible display sheet attached over the inner surfaces of both the first and the second casings is disclosed. The articulated hinge has a frame portion, wherein an odd number (1+2n, where n is an integer greater than or equal to 2) of vertical frames are arranged in parallel along a width direction, where its shorter-side direction is the width direction and its vertical direction is a vertical direction.

9 Claims, 33 Drawing Sheets

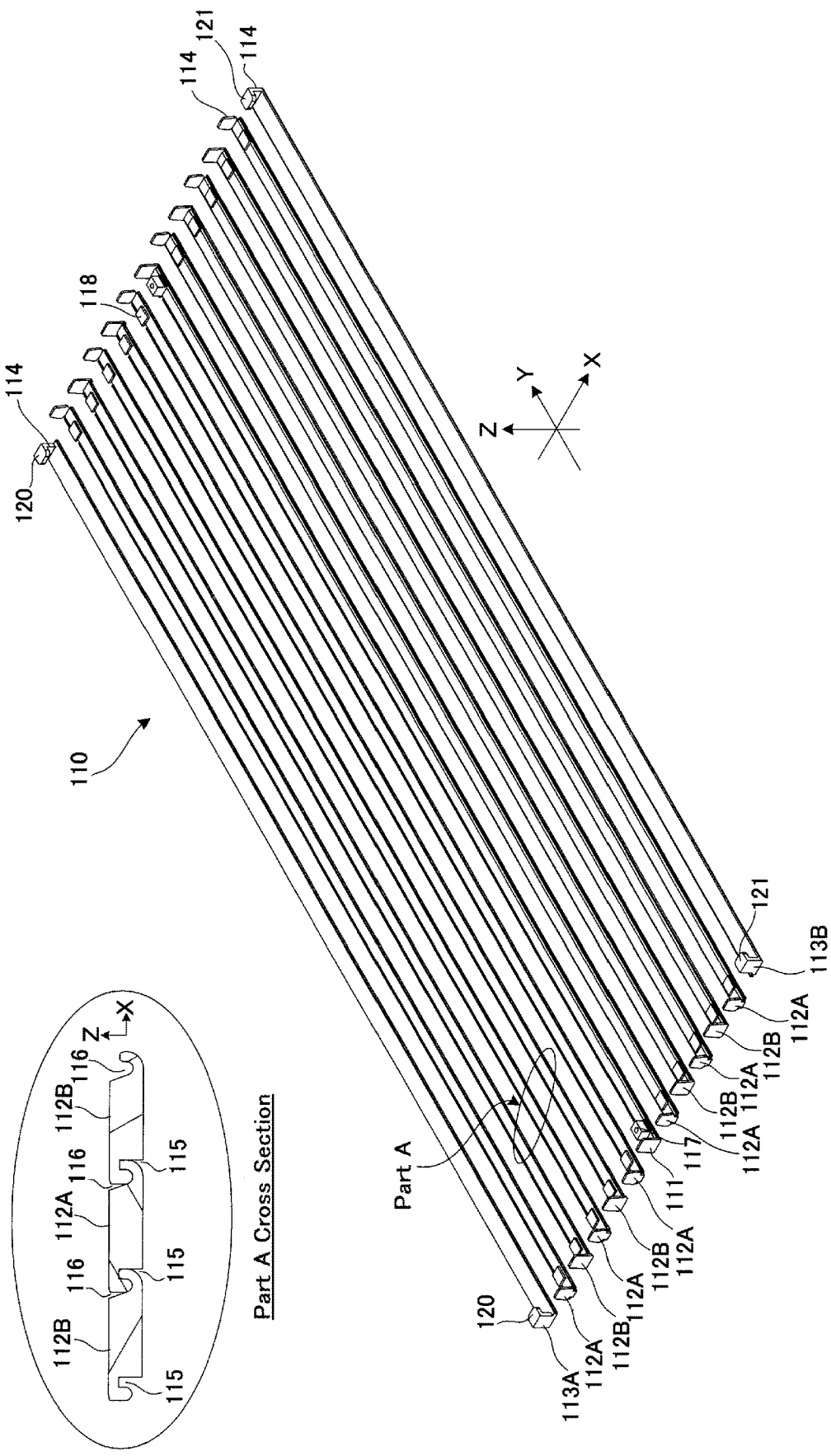

ARTICULATED HINGE DEVICE AND ELECTRONIC DEVICE USING THE SAME

FIELD OF THE INVENTION

The invention relates to an articulated hinge device suitably used in an electronic device, such as foldable mobile phone, electronic notebook, PDA, netbook and notebook PC, which is built by attaching a flexible display sheet made e.g. of organic EL over respective surfaces of a first casing and a second casing, wherein organic light emitting diodes (OLEDs) are used as light emitting diodes of a bendable display member; it further relates to an electronic device using such an articulated hinge device.

BACKGROUND ART

Recently, an electronic device, such as mobile phone, which is built by attaching a single flexible display sheet made of organic EL over respective surfaces of a first and a second casings has been developed and is establishing its presence step by step. As a hinge device coupling a first casing and a second casing of such an electronic device, such that these casings are openable and closable relative to each other, a multiaxial hinge device using a plurality of hinge pins is known in JP Laid-Open Patent Application No. 2020-125841. This multiaxial hinge device enables the first and second casings to be opened and closed with no change in surface length of the flexible display sheet. Still further, it is designed such that a bent part keeps a constant radius of curvature in a space part inside the multiaxial hinge device in order to prevent a flexible display sheet from snapping or causing failure when the first casing and the second casing are opened and closed.

By the way, in a conventional multiaxial hinge device, when a first casing and a second casing are opened and closed and a bent part of the flexible display sheet is deformed from a flat state to a curved and folded state, the folded part is deformed within a space of the multiaxial hinge device. Therefore, the folded part is not always held in a stable state, and the folded part of the flexible display sheet may shift within the space that accommodates the folded part of the flexible display sheet in the multiaxial hinge device.

SUMMARY OF THE INVENTION

The purpose of the present invention is to provide an articulated hinge device that can always hold a bent part of a flexible display sheet that deforms following the opening and closing of the first and second casings, and an electronic device using this articulated hinge device.

In order to solve the above problem, an articulated hinge device of the first invention couples a first casing and a second casing of an electronic device in a foldable manner by a relative folding motion between an opened position and a closed position, wherein the articulated hinge device is arranged on the back side of a flexible display sheet attached over the inner surfaces of both the first casing and the second casing, wherein the articulated hinge device comprises a frame portion, wherein an odd number (1+2n, where n is an integer greater than or equal to 2) of vertical frames are arranged in parallel along a width direction, wherein its shorter-side direction is the width direction and its longitudinal direction is a vertical direction; a first base frame arranged in parallel with the vertical frame at one end of the frame portion in the width direction and attached to the first casing; a second base frame arranged in parallel with the vertical frame at the other end of the frame portion in the width direction and attached to the second casing; articulated portions comprising articulation joints respectively arranged between adjacent frames for rotatably displacing the adjacent frames along a predetermined trajectory, while changing directions and angles of their respective rotation in a frame row composed of the first base frame and the second base frame, wherein the both base frames are parallel to each other on both sides in the width direction of the odd number of vertical frames; a synchronous driving portion for coupling the adjacent frames in the frame row in series by gears and for synchronously displacing each of the adjacent frames in the direction away from each other when the second base frame and the second base frame shift relative to each other in a direction toward the closed position, and synchronously displacing each of the adjacent frames in the direction in which the both approach each other when the second base frame and the second base frame shift relative to each other in the opening direction; and a stop holding portion for stopping the first base frame in its rotation movement relative to the vertical frame adjacent to the first base frame, as well as the second base frame in its rotation movement relative to the vertical frame adjacent to the second base frame, and for holding them between the closed position and the opened position.

An articulated hinge device of the second invention is an articulated hinge device of the first invention, wherein articulation joints can be composed of an arc-shaped arm provided on one adjacent frame with a guide surface being a predetermined curved surface and of guide holes provided on other adjacent frame in the frame for sliding relative to the one adjacent frame along the guide surface of the arc-shaped arm to be engaged with the adjacent frame.

An articulated hinge device of the third invention is an articulated hinge device of the first or second invention, wherein one or more groups of frames is/are arranged in a bilaterally symmetrical manner, wherein one group is made up with the second and third vertical frames installed side by side on both sides in order from the first vertical frame side, and that two articulated portions can be provided at both ends of the frame section in the vertical direction, or at three articulated portions at both ends and the center of the frame section in the vertical direction.

An articulated hinge device of the fourth invention is an articulated hinge device of the third invention, wherein articulation joints of articulated portions comprise articulation joints on the left side in the width direction respectively provided between the first vertical frame and the first base frame, and articulation joints on the right side in the width direction respectively provided between the first vertical frame and the second base frame, wherein articulation joints on the left side in the width direction can be configured to ensure that the arc-shaped arms respectively project from the first vertical frame, the second and third vertical frames toward the first base frame side, and guide hole portions are each provided on the second and third vertical frames and the first base frame corresponding to each arc-shaped arm, and the articulation joints on the right side of the width direction can be configured to ensure that arc-shaped arms protrude respectively from the first vertical frame, the second and the third vertical frame toward the second base frame side, and guide hole portions are each provided on the second vertical frame, the third vertical frame and the second base frame corresponding to each arc-shaped arm.

An articulated hinge device of the fifth invention is an articulated hinge device of one of the first to third inventions, wherein the synchronous driving portion can be configured to ensure that a plurality of synchronous gear trains are provided along the width direction, wherein three consecutive frames in parallel are coupled as one group by gears in series, and synchronous gear trains adjacent along the width direction share the two adjacent frames close to the adjacent synchronous gear train among the three which make up one group.

An articulated hinge device of the sixth invention is an articulated hinge device of the fifth invention, wherein the synchronous gear train can be configured to ensure that a meshing position of a first arc-shaped arm with a left synchronous gear and a meshing position of a right synchronous gear with a second arc-shaped arm shift from the root to the tip side during the folding motion from the open to the closed position and from the tip portion side to the base portion side during the folding motion from the closed position to the opened position.

An articulated hinge device of the seventh invention is an articulated hinge device of the third invention, wherein it can be configured to ensure that an insertion hole into which a tip of an arc-shaped arm penetrating through a guide hole portion provided on the second vertical frame adjacent to the first vertical frame side is inserted provided on the third vertical frame, and insertion holes into which tips of arc-shaped arms penetrating through a guide hole portion provided on the third vertical frame adjacent to the first vertical frame side are inserted are provided on the first and second base frames.

An articulated hinge device of the eighth invention is an articulated hinge device of one of the first to seventh inventions, wherein the articulated hinge device can be configured to ensure that a plurality of articulation joints provided between the first vertical frame and the first base frame are arranged with articulation joints adjacent to each other in the width direction being displaced from each other in the vertical direction, and a plurality of articulation joints provided between the first vertical frame and the second base frame are arranged with articulation joints adjacent to each other in the width direction being displaced from each other in the vertical direction.

An articulated hinge device of the ninth invention is an articulated hinge device of the first invention, wherein the articulated hinge device can be configured to ensure that the stop holding portion comprises a first friction click stop mechanism provided on the first base frame having a first input gear, a second friction click stop mechanism provided on the second base frame having a second input gear, a first coupling gear fixed to a vertical frame adjacent to a second base frame and meshed with the first input gear, and a second coupling gear fixed to a vertical frame adjacent to a second base frame and meshed with the second input gear, and wherein the first and second friction click stop mechanisms comprise a cam portion having a corrugated portion, wherein click bodies respectively fixed to the rotary shafts of the first and second input gear rotate integrally with each of the rotary shafts and click-engage at the open and closed positions, and a friction force generating portion for giving a friction force on the rotation of the rotary shaft.

An articulated hinge device of the tenth invention is an articulated hinge device of one of the first to the ninth inventions, wherein the articulated hinge device is configured to ensure that a back side cover portion covering a frame portion is provided on a back side of the frame portion, wherein the back side cover portion has a plurality of longitudinal cover plates formed in the shape of longitudinal strip, aligned along the width direction and rotatably coupled to each other around a longitudinal axis, wherein the longitudinal cover plate at one end in the width direction among the plurality of longitudinal cover plates is engaged with the first base plate to be movable in the width direction relative to the first base plate, while the cover plate at the other end of the width direction is engaged with the second base frame to be movable in the width direction relative to the second base frame.

An electronic device of the eleventh invention comprises a first casing, a second casing, and a flexible display sheet mounted over the inner surfaces of both the first and the second casings, a flexible display sheet and an articulated hinge device of any of the first to tenth inventions coupling the first and second casings in a foldable manner by a relative folding motion between the open and closed positions and arranged on the back side of the flexible display sheet.

According to the first invention, when the first casing and the second casing are opened and closed relative to each other, the surface of the frame portion describes parabola to turn from a flat to a semicircular arc-shaped surface, and the folded part of the flexible display sheet is held in place following the surface of the frame portion 10. Therefore, the folded part of the flexible display sheet, which is folded in a semicircular arc shape, can be stably held in the closed position without swaying. In addition, no sag or wrinkling occurs when the product is used in an opened state.

According to the second invention, the sliding engagement of arc-shaped arms with guide hole portions can ensure that adjacent frames alter the gap between them by changing the direction and angle of their rotation relative to each other along a predetermined trajectory, wherein the length in the width direction of the frame portion corresponding to the string length is short, and the length in the width direction of the frame portion corresponding to the arc length is long in the closed position. Therefore, no sag nor other problems occur at the folded part of the flexible display sheet.

According to the third invention, articulation joints are arranged with a good balance in the longitudinal and width directions of a frame row to allow smooth rotation movement of each frame making up the frame row due to opening and closing operation.

According to the fourth invention, the curved surface which the opening and closing operation describes on the surface of the frame portion can be a symmetrical parabola centered on the first vertical frame, and there is no partial stress concentration in the bent part of the flexible display sheet, which can prevent damage to the flexible display sheet.

According to the fifth invention, if a plurality of synchronous gear trains are distributedly arranged in a frame row, an entire synchronous driving portion can be more compact and an articulated hinge device itself can be thinner.

According to the sixth invention, it is possible to realize the rotation movement of adjacent frames relative to each other in a simple structure.

According to the seventh invention, even longer arc-shaped arms can avoid an interference of their tips with other vertical frames, etc. and assure the opening and closing operation.

According to the eighth invention, a stress applied to arc-shaped arms and guide hole portions is dispersed to realize a smooth opening and closing operation by avoiding an interference between adjacent articulation joints and by distributedly arranging the joint contacts in a vertical direction.

According to the ninth invention, a first friction click stop mechanism and a second friction click stop mechanism can be housed along the vertical direction in the first base frame and the second base frame, respectively, so that an articulated hinge device can be made more compact, that components making up the first and second friction click stop mechanisms can be also arranged vertically, and that the first friction click stop mechanism and the second friction click stop mechanism can be made more compact.

According to the tenth invention, the back side of the frame section can be covered following an opening and closing movement.

According to the eleventh invention, an articulated hinge device can protect the folded part of a flexible display sheet and provide a foldable electronic device with reduced occurrence of failure of the flexible display sheet.

BRIEF DESCRIPTION OF THE DRAWINGS

FIG. 5D shows an enlarged perspective view of a back side cover portion of an articulated hinge device as shown in FIG. 5A;

EMBODIMENT

Figure 1:
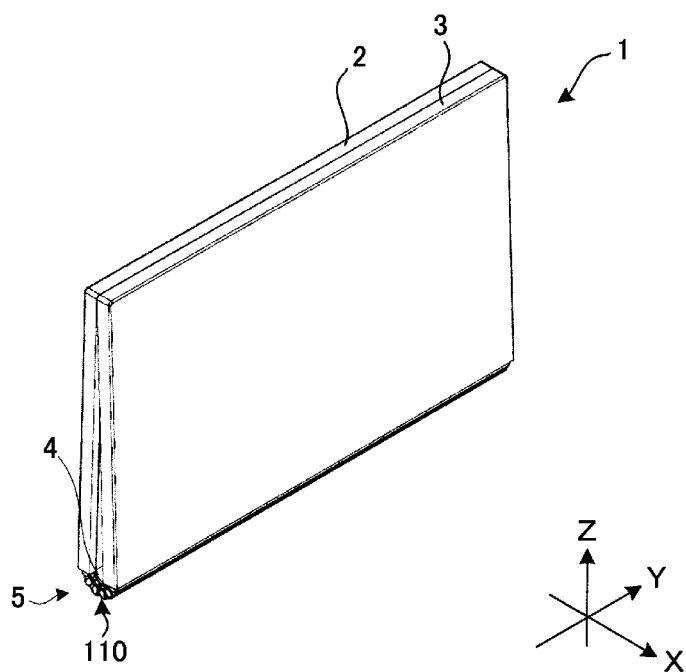
FIG. 1 is a perspective view of appearance showing an embodiment of a twofold-type electronic device using an articulated hinge device according to the invention, in particular a closed state in which the first and second casings face each other and are in contact.

In the following, reference is made to an articulated hinge device according to the invention and an electronic device using the articulated hinge device, based on embodiments shown in the drawings.

Figure 2:
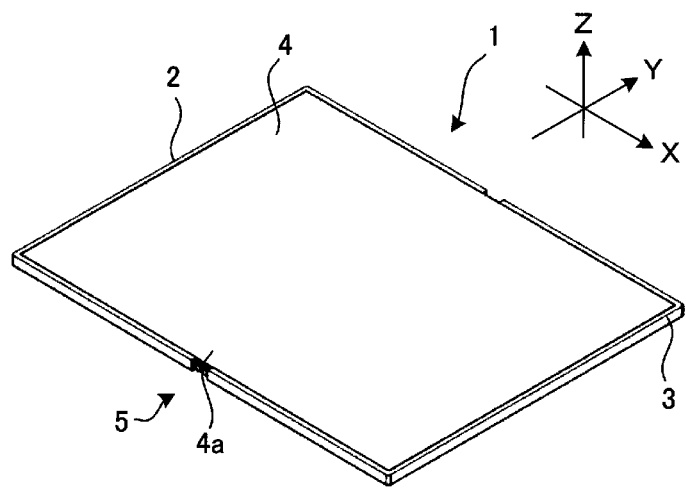
FIG. 2 is a perspective view of appearance showing an opened state in which a first casing and a second casing opened 180 degrees in an electronic device shown in FIG. 1.

FIGS. 1 and 2 show a perspective view of appearance of an electronic device using an articulated hinge device according to the invention. A flexible display sheet 4 made e.g. of organic EL is attached to an electronic device 1, wherein organic light emitting diodes (OLEDs) are used as light emitting diodes of a bendable display member over respective surfaces of a first casing 2 and a second casing 3. The first casing 2 and the second casing 3 are coupled to each other via an articulated hinge device 5; these casings are coupled to each other to have a flexible display sheet 4 bendable inward between a closed state in which one contact another facing each other with display surfaces, and an opened state in which both are opened 180 degrees relative to each other. The following description is made based on a notebook PC as an example of the electronic device 1, but further examples include various electronic devices such as mobile phone, electronic notebook, PDA, netbook.

In an opened state in which a first casing 2 and a second casing 3 are opened 180 degrees relative to each other, and where X-, Y- and Z-axes are three axes perpendicular to each other, a direction in which the first casing 2 and the second casing 3 are aligned in X-axis direction is referred to as a width direction (also referred to as a right and left direction), while a hinge axis direction perpendicular to the width direction in Y-axis direction as a vertical direction and a Z-axis direction as a front and rear surface direction. In the vertical direction, a side close to the user is referred to as a front side, while a side opposite to the user as a rear side, in the state in which the first casing 2 and the second casing 3 are opened in the right and left direction, as shown in FIG. 2. Still further, in the front and rear surface direction, a front surface side is also referred to as an inner surface side, while a rear surface side as a back surface side.

Figure 3:
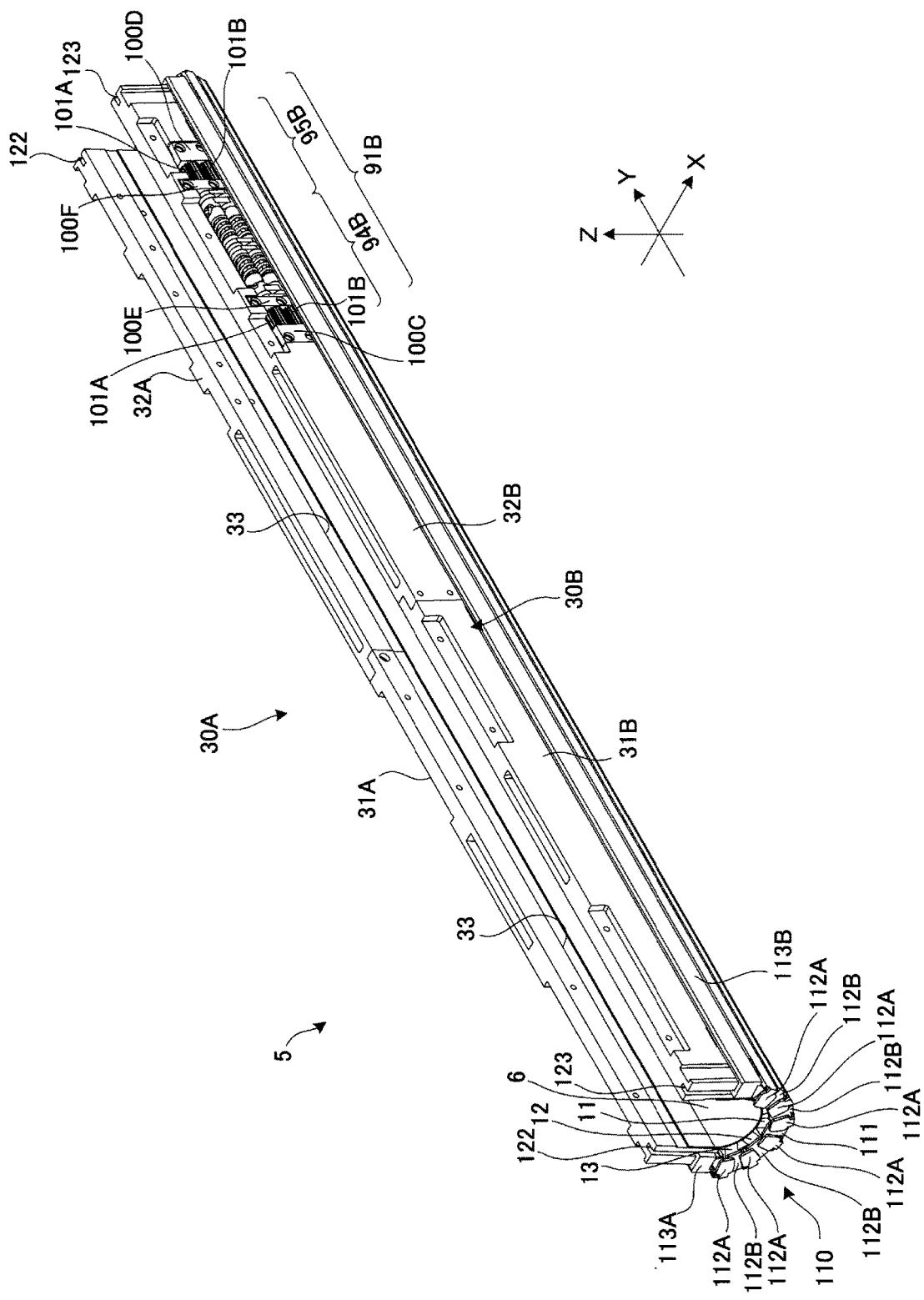
FIG. 3 is a perspective view of appearance showing an embodiment of an articulated hinge device according to the invention, in particular its closed state.
Figure 4:
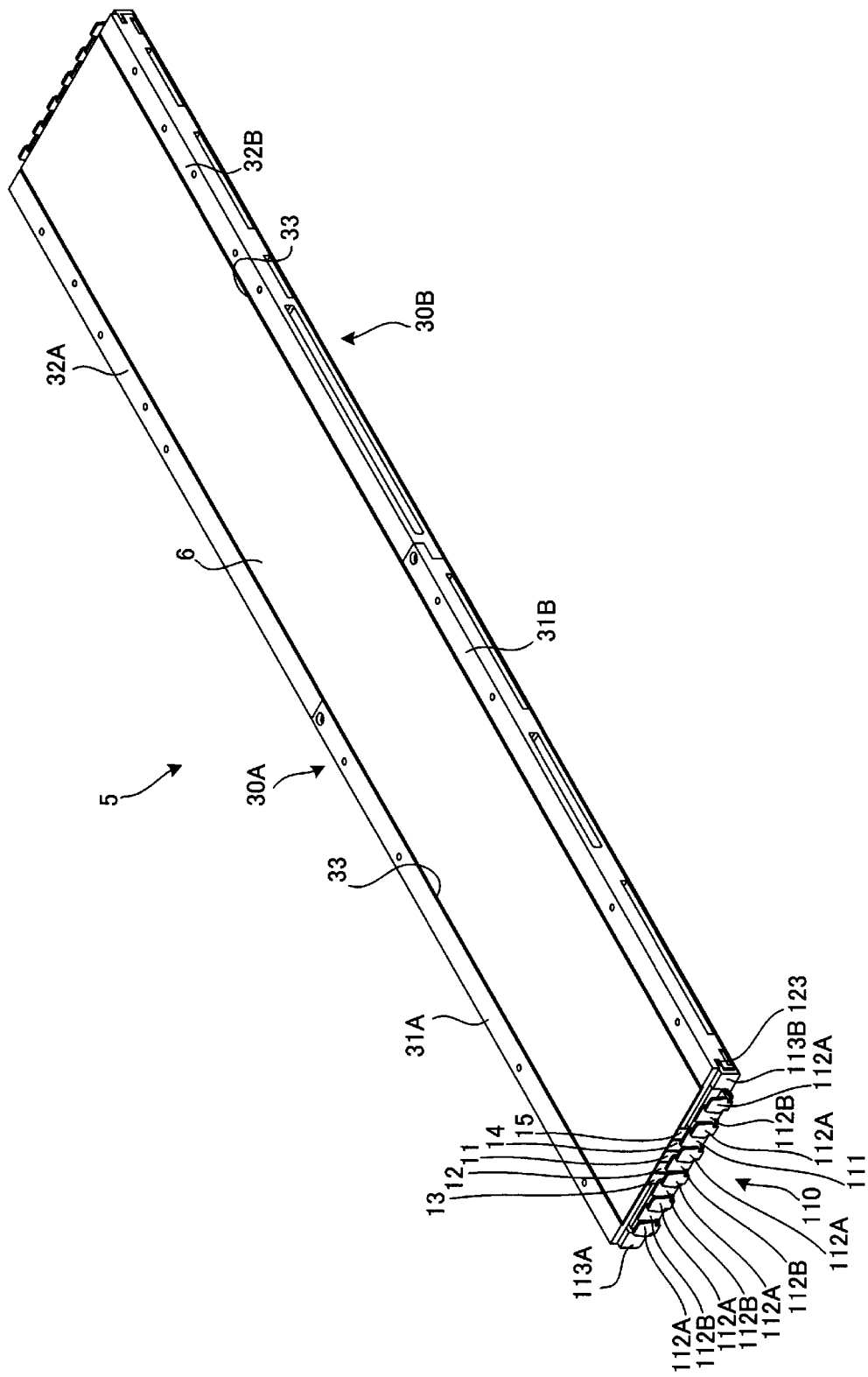
FIG. 4 is a perspective view of appearance showing an embodiment of an articulated hinge device according to the invention, in particular its opened state.

An articulated hinge device 5 is bent in U-shape as seen from the front side in a closed state shown in FIG. 3, and unfolded to be flat in the right and left direction in an opened state shown in FIG. 4. A support sheet 6 having flexibility on its surface and a rectangular flat plate shape is attached to the articulated hinge device 5.

Next, reference is made to components of an articulated hinge device 5, based on exploded perspective views shown in FIG. 5A to FIG. 5D.

Figure 5A:
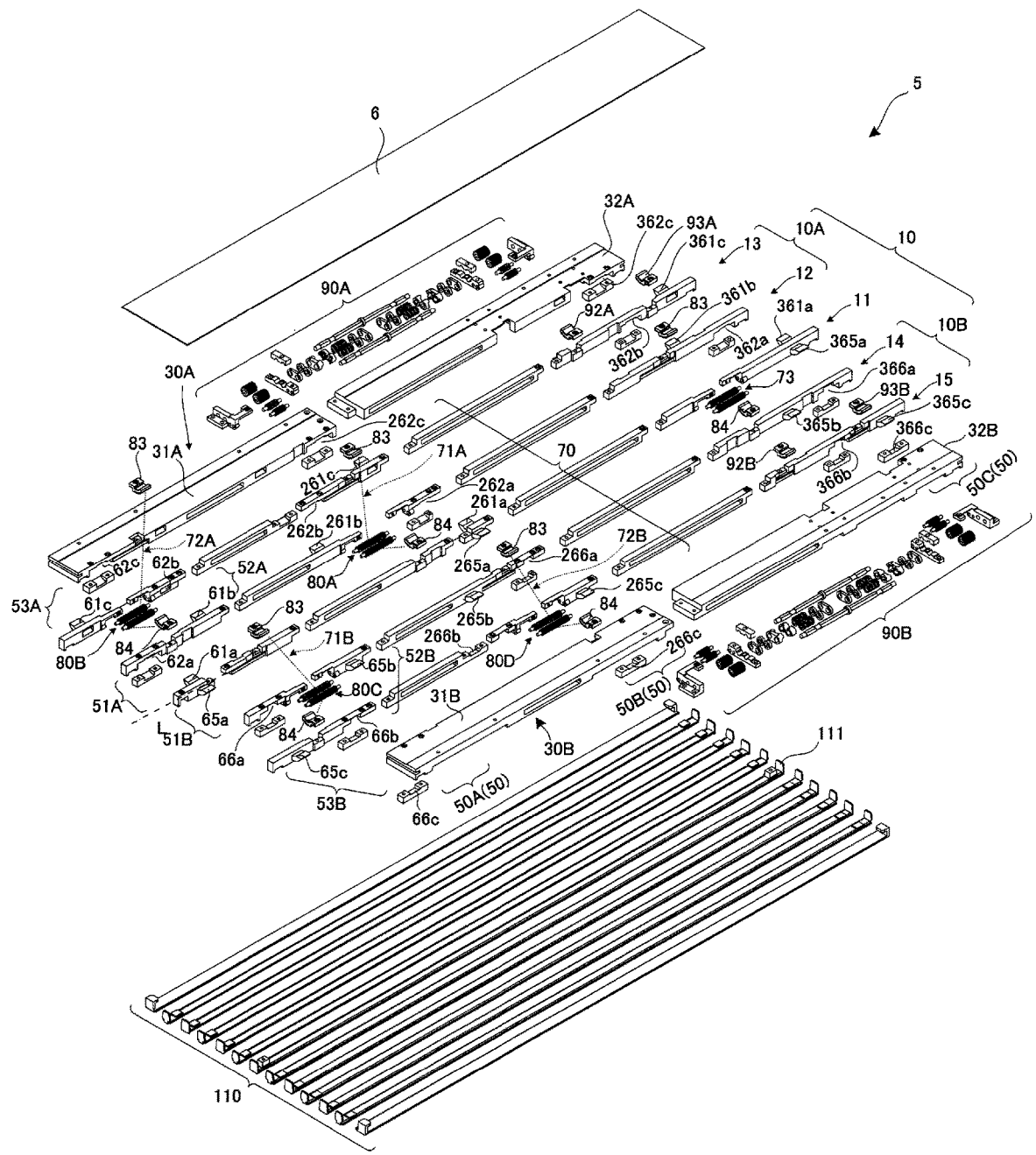
FIG. 5A shows an exploded perspective view of an embodiment of an articulated hinge device according to the invention.
Figure 5B:
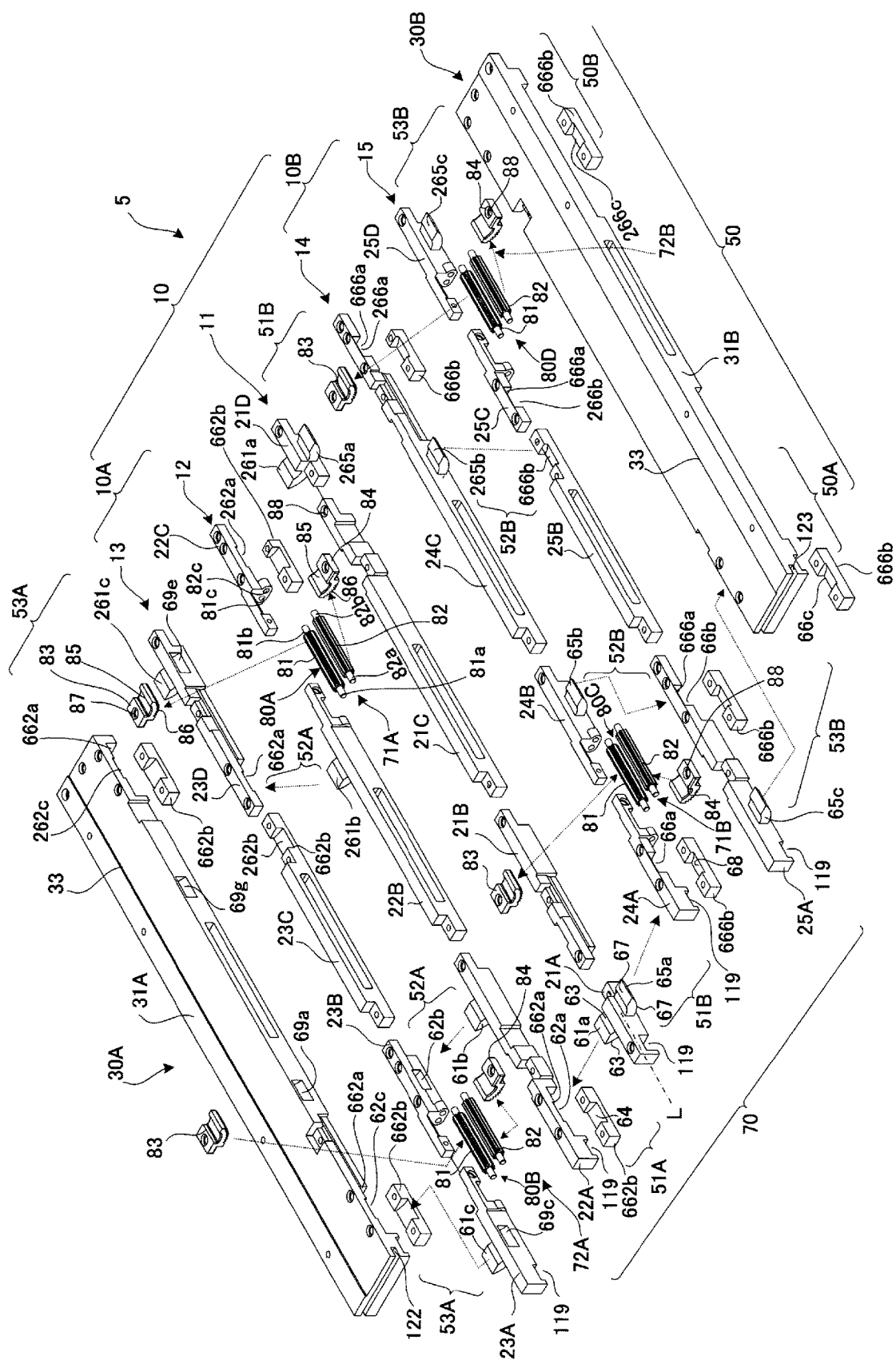
FIG. 5B is an enlarged perspective view of an articulated portion and a synchronous driving portion of an articulated hinge device shown in FIG. 5A.
Figure 5C:
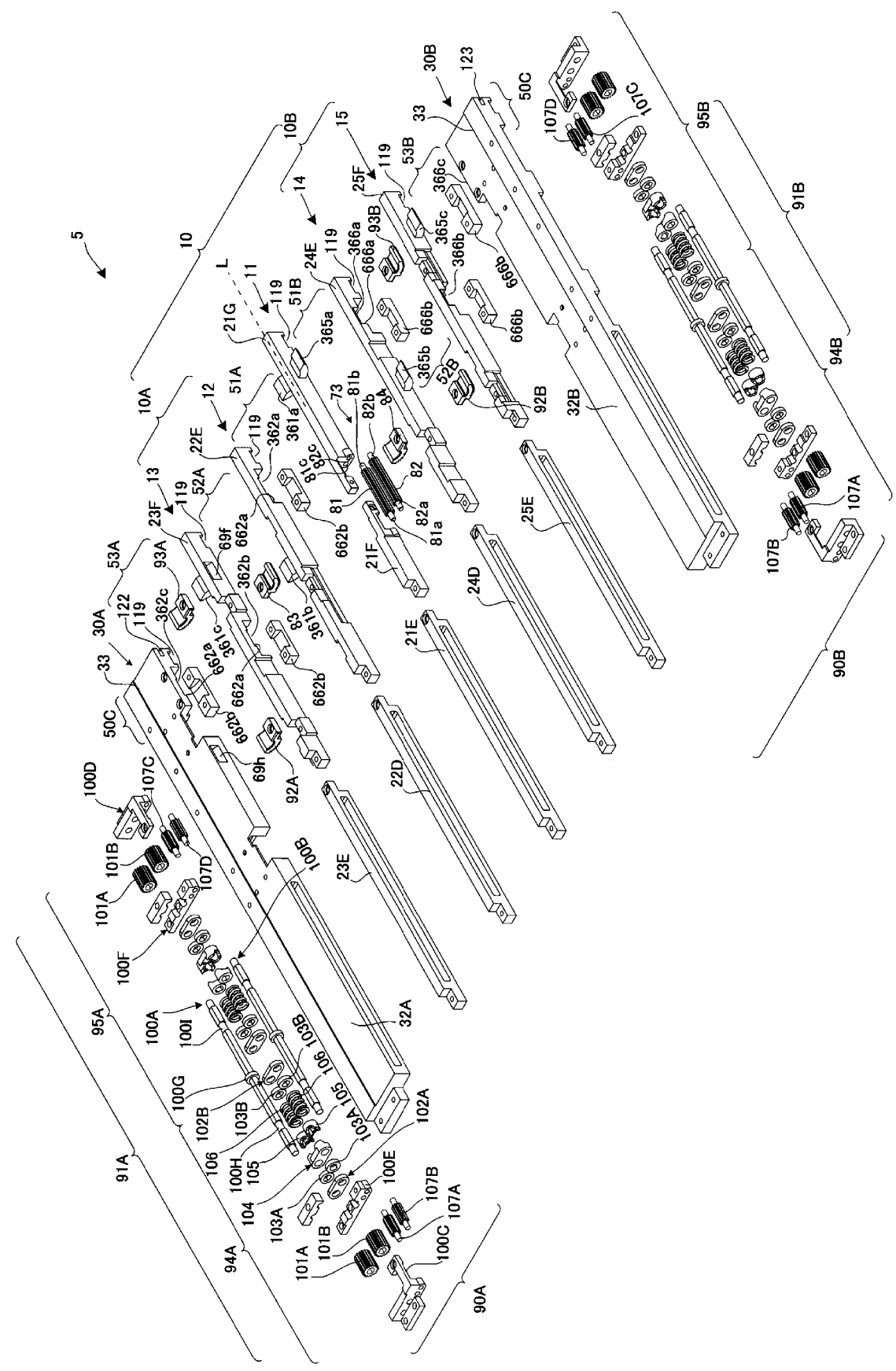
FIG. 5C is an enlarged perspective view of the friction click stop portions of the articulated hinge device shown in FIG. 5A.

FIG. 5A shows an overall structure of an articulated hinge device 5, while FIG. 5B—front side parts of a frame portion 10 of the articulated hinge device 5, as well as an articulated portion 50, a synchronous driving portion 70 on a front side and an intermediate portion of a first and a second base frames 30A, 30B. FIG. 5C shows rear side parts of a frame portion 10 of the articulated hinge device 5, the first and the second base frames 30A, 30B, as well as an articulated portion 50 on a rear side, and a first and a second friction click stop portions 90A, 90B being stop holding portions. FIG. 5D shows a back side cover portion 110.

An articulated hinge device 5 comprises a frame portion 10 configured to ensure that five elongated vertical frames 11 to 15 extending in a vertical direction are aligned, a first base frame 30A fixed by screws (not shown) to the first casing 2 and a second base frame 30B fixed by screws (not shown) to the second casing 3. Still further, the articulated hinge device 5 comprises articulated portions 50, a synchronous driving portion 70 as well as a first and a second friction click stop portions 90A, 90B.

<Schematic Structure of Frame Portion 10>

Five elongated vertical frames 11 to 15 of a frame portion 10 are all formed substantially in the shape of rectangular parallelepiped, with shorter sides in a width direction and longer sides in a vertical direction, wherein each single frame is made up with a plurality of frame bodies fixed in series along the vertical direction. A vertical frame arranged in the center in the width direction is referred to as a first vertical frame 11, while those on the left side in the width direction from the first vertical frame 11 are referred to as a left second vertical frame 12 and a left third vertical frame 13 sequentially toward a first base frame 30A. Still further, vertical frames on the right side in the width direction from the first vertical frame 11 are referred to as a right second vertical frame 14 and a right third vertical frame 15 sequentially toward a second base frame 30B. The left second vertical frame 12 and the left third vertical frame 13 are referred to as one group, a left frame group 10A, while the right second vertical frame 14 and the right third vertical frame 15—as a right frame group 10B. In this embodiment the left frame group 10A and the right frame group 10B are arranged on the right and left of the first vertical frame 11.

<Schematic Structure of First Base Frame 30A and Second Base Frame 30B>

Figure 7:
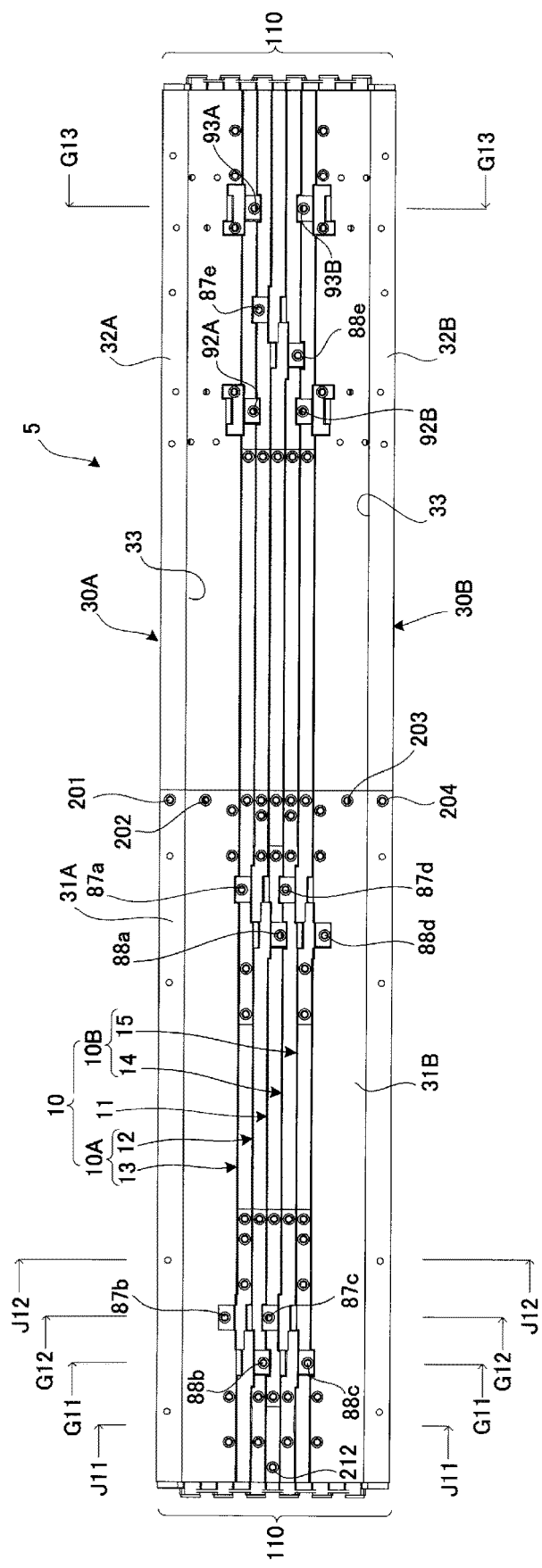
FIG. 7 shows a top view of an articulated hinge device in the open position shown in FIG. 4, with a support sheet being removed.

A first base frame 30A is made up with a front first base frame body 31A and a rear first base frame 32A coupled to each other in series along a vertical direction, wherein their coupling parts are fixed to each other by screws 201, 202, as shown in FIG. 7. A second base frame 30B is made up with a front second base frame body 31B and a rear second base frame 32B coupled to each other in series along a vertical direction, wherein their coupling parts are fixed to each other by screws 203, 204. Stepped portions 33 respectively with a lower inner side and a higher outer side as seen in a right and left direction are formed on front surface sides of a first base frame 30A and a second base frame 30B. A stepped portion 33 has a height equal to a thickness of a support sheet 6, and the support sheet 6 is arranged in the inner side of the stepped portion 33.

A first friction click stop portion 90A is provided on a rear first base frame 32A, and a second friction click stop portion 90B on a rear second base frame 32B.

<Structure of Articulated Portion 50>

An articulated portion 50 comprises a left first articulation joint 51A provided between a first vertical frame 11 and a left second vertical frame 12, a left second articulation joint 52A provided between the left second vertical frame 12 and a left third vertical frame 13, and a left third articulation joint 53A provided between the left third vertical frame 13 and a first base frame 30A. Furthermore, it comprises a right first articulation joint 51B provided between a first vertical frame 11 and a right second vertical frame 14, a right second articulation joint 52B provided between the right second vertical frame 14 and a right third vertical frame 15, and a right third articulation joint 53B provided between the right third vertical frame 15 and a second base frame 30B. The left first articulation joint 51A to the left third articulation joint 53A and the right first articulation joint 51B to the right third articulation joint 53B make up a set.

A left first articulation joint 51A and a left third articulation joint 53A on one hand, and a right first articulation joint 51B and a right third articulation joint 53B are all provided at the same position in a vertical direction, while a left second articulation joint 52A and a right second articulation joint 52B are provided rearward from the left first articulation joint 51A. Articulated portions 50 realize a movement for realizing variations of gap between frames, i.e. each vertical frame 11 to 15 of a frame portion 10, a first base frame 30A and a second base frame 30B, with changing a direction and an angle of their rotation (this movement is hereinafter referred to as articulated hinge movement).

In this embodiment, three articulated portions 50 in total are provided on both end portions in the vertical direction and at an intermediate position to realize a smooth articulated hinge movement. The one on a front side in the vertical direction is referred to as a first row articulated portion 50A, while the one at an intermediate position as a second row articulated portion 50B and the one on a rear side in the vertical direction as a third row articulated portion 50C.

Articulated portions 50 provide a displacement trajectory for assuring by the articulated hinge movement a continuous shift from a bent state in the U-shape to a flat state, in a front view of a frame portion 10 along the front and rear direction, by a relative opening and closing of a first casing 2 and a second casing 3 between a closed state at a position where the first casing 2 contact the second casing 3 facing each other with display surfaces (at a minus angle beyond 0 degree) and an opened state in which both are opened 180 relative to each other.

In this embodiment, a left first to a left third articulation joints 51A to 53A of a first row articulated portion 50A provided on the left side of a first vertical frame 11 realize variations between frames i.e. the first vertical frame 11, respective left vertical frames 12, 13 of a left first frame group 10A and a first base frame 30A, while altering their rotation directions and angle relative to each other between an opening and closing angle of 0 degree and that of substantially 90 degrees (slightly greater than 90 degrees). Similarly, a first to a right third articulation joints 51B to 53B provided on the right side of a first vertical frame 11 realize variations between frames, the first vertical frame 11, respective left vertical frames 14, 15 of a right first frame group 10B and a second base frame 30B, while altering their rotation directions and angle of relative to each other between an opening and closing angle of 0 degree and that of substantially 90 degrees.

A left trajectory where the left first frame group 10A and the first base frame 30A are bent with realizing variations between frames while altering their rotation directions and angle and a right trajectory where the right first frame group 10B and the second base frame 30B are bent with realizing variations between frames while altering their rotation directions and angle are symmetrical on the right and left about the first vertical frame 11.

As shown in FIG. 5A, FIG. 5B, FIG. 9 and FIG. 10, a first, a second and a left third articulation joints 51A, 52A and 53A making up a first row articulated portion 50A comprise respectively a left first to a left third arc-shaped arms 61a to 61c, and a left first to a left third guide hole portions 62a to 62c respectively provided on a first vertical frame 11, a left second vertical frame 12 and a left third vertical frame 13, wherein the left first to the left third guide hole portions extend toward the left, are formed in the shape identical to the left first to the left third arc-shaped arms, and the left first to the left third arc-shaped arms 61a to 61c are slidably engaged with the left first to the left third guide hole portions. A left first guide hole portion 62a is formed on the left second vertical frame 12, while a left second guide hole portion 62b on the left third vertical frame 13 and the left third guide hole portion 62c on right side surface of the first base frame 30A.

The left first to the left third arc-shaped arms 61a to 61c form curved surfaces 63 (see FIG. 9 and FIG. 10) for providing an arc-shaped displacement trajectory extending toward a front surface in a front and a rear direction on their front and a rear surfaces. On a left first to a left third guide hole portions 62a to 62c, an inner circumferential surface 64 (see FIG. 9 and FIG. 10) is formed, wherein the curved surface 63 on a front and a rear surfaces of the left first to the left third arc-shaped arms 61a to 61c abut against the inner circumferential surface. The left guide hole portions 62a to 62c are guided by the curved surface 63 between a base side and a tip portion of the left first to the left third arc-shaped arms 61a to 61c to be slidably engaged with the left first to the left third arc-shaped arms.

Still further, a first to a right third articulation joints 51B to 53B arranged on the right side of a first vertical frame 11 are arranged in a horizontal symmetry with a left first to a left third articulation joints 51A to 53A centered on the first vertical frame 11. A first to a right third arc-shaped arms 65a to 65c and a first to a right third guide hole portions 66a to 66c are respectively formed in a horizontal symmetry with a left first to a left third arc-shaped arms 61a to 61c and a left first to a left third guide hole portions 62a to 62c. The right first to the right third arc-shaped arms 65a to 65c form a curved surface 67 (see FIG. 9 and FIG. 10) for assuring an arc-shaped displacement trajectory on their front and rear surfaces, and extend toward the right side. The right first to the right third guide hole portions 66a to 66c comprising an inner circumferential surface 68 (see FIG. 9 and FIG. 10), wherein the curved surface 67 on the front and the rear surfaces abut against the right first to the right third guide hole portions, are formed on a right second vertical frame 14, a right third vertical frame 15 and a second base frame 30B. The right guide hole portions 66a to 66c are guided by the curved surface 67 between a base side and a tip portion of the right first to the right third arc-shaped arms 65a to 65c to be slidably engaged with the right first to the right third arc-shaped arms.

It is noted that, in FIG. 5A and FIG. 5B, as per components of a second row articulated portion 50B, a left first to a left third arc-shaped arms are denoted with reference numerals 261a to 261c, while a right first to a right third guide hole portions with 262a to 262c, a right first to a right third arc-shaped arms with 265a to 265c and a right first to a right third guide hole portions with 266a to 266c. Equally, in FIG. 5A and FIG. 5C, as per components of a third row articulated portion 50C, a left first to a left third arc-shaped arms are denoted with reference numerals 361a to 361c, while a right first to a right third guide hole portions with 362a to 362c, a first to a right third arc-shaped arms with 365a to 365c and a right first to a right third guide hole portions with 366a to 366c.

Reference is made to the articulated hinge movement, in reference to an example of the first row articulated portion 50A. In this embodiment, three articulation joints, the left first articulation joint 51A, the left second articulation joints 52A and the left third articulation joints 53A provided on the left side of the first vertical frame 11 realize variations between adjacent frames, i.e. the first vertical frame 11 and the left second vertical frame 12, the left second vertical frame 12 and the left third vertical frame 13, and the left third vertical frame 13 and the first base frame 30A, while altering directions and angle of their rotation relative to each other at an angle between of 0 degree to 30 degrees, to assure rotation. When the left first to the left third articulation joints 51A to 53A are rotated between 0 degree and 30 degrees by this articulated hinge movement, a trajectory described by each frame of the first vertical frame 11 to the first base frame 30A has a bent arc shape having an opening and closing angle of 90 degrees from a horizontal state (quarter arc shape). Equally three articulation joints, a right first to a right third articulation joints 51B to 53B provided on a right side of a first vertical frame 11 are also respectively rotated between 0 degree and 30 degrees.

On the other hand, a flexible display sheet 4 has a freely deformable portion 4a of constant length in a right and left direction over a first casing 2 and a second casing 3. Based on examples of chord length and arc length in an arc, a chord length is longer than an arc length. If a length from the first base frame 30A through the frame portion 10 to the second base frame 30B in an opened state is a chord length, the chord length must be longer than a length from the first base frame 30A through the frame portion 10 to the second base frame 30B in the width direction, to deform the freely deformable portion 4a into a deformed shape in a closed state. To this end, the left first to the left third articulation joints 51A to 53A and the right first to the right third articulation joints 51B to 53B realize variations in gaps between respective frames relative to each other, to expand and contract the distance between the adjacent frames on the right and left (in the width direction).

Figure 31:
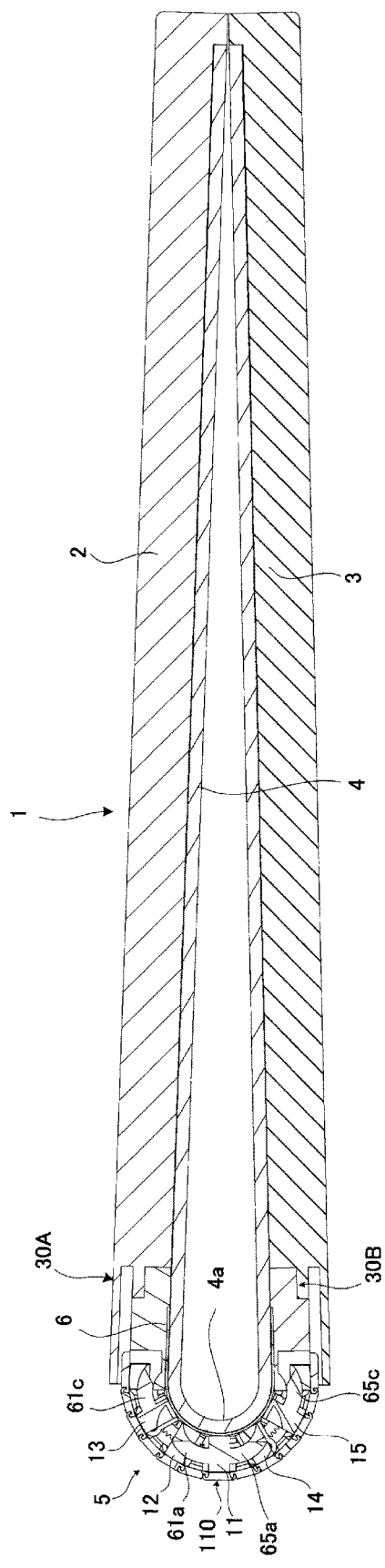
FIG. 31 shows a cross section of an electronic device in a closed state as shown in FIG. 1, along its folding direction, further corresponding to a cross section of an articulated hinge device in a closed state as shown in FIG. 24.

It is noted that if the rotation angle is slightly greater than 30 degrees, the opposed surfaces of the flexible display sheet 4 can be inclined surfaces and the outer ends in the right and left direction of the first casing 2 and the second casing 3 can abut against each other in the closed state, as shown in FIG. 31.

Figure 9:
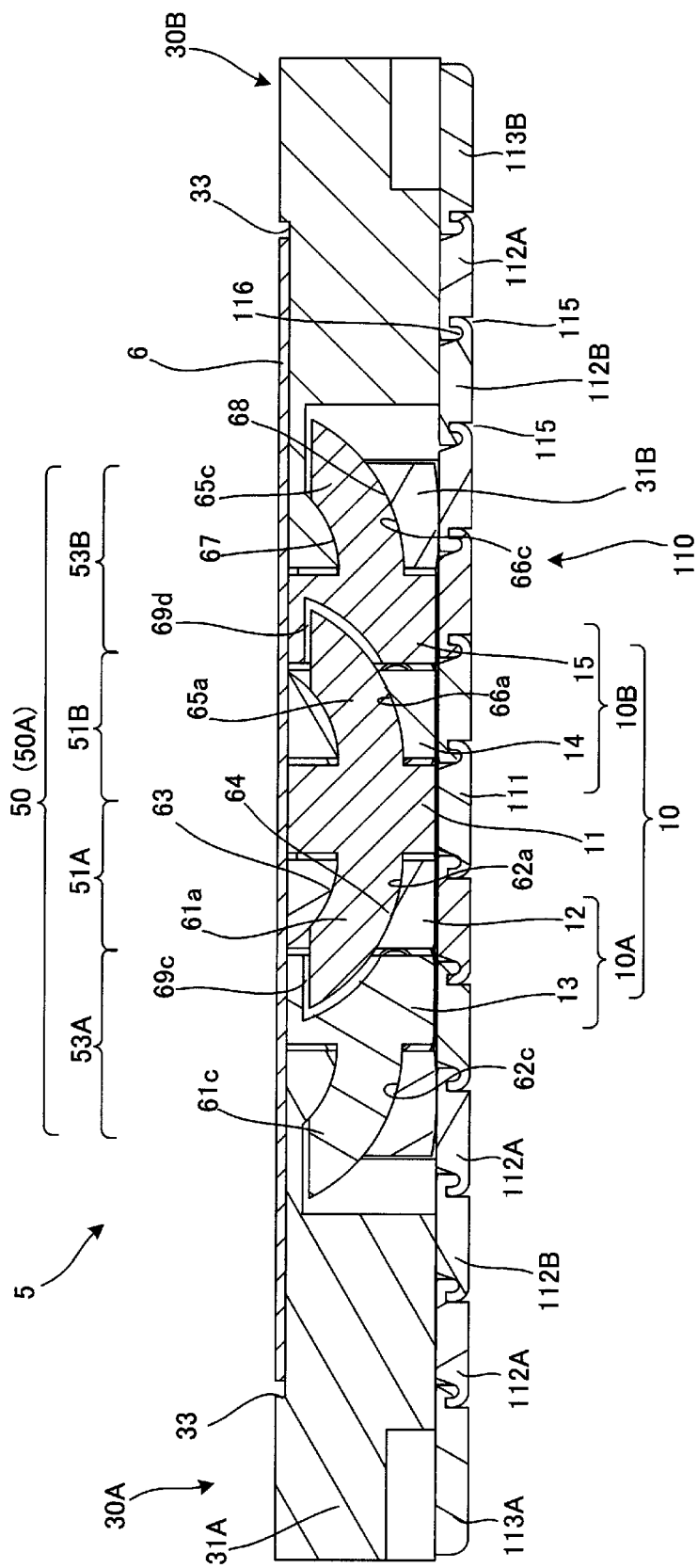
FIG. 9 shows a cross section in line J11-J11 in FIG. 7.
Figure 10:
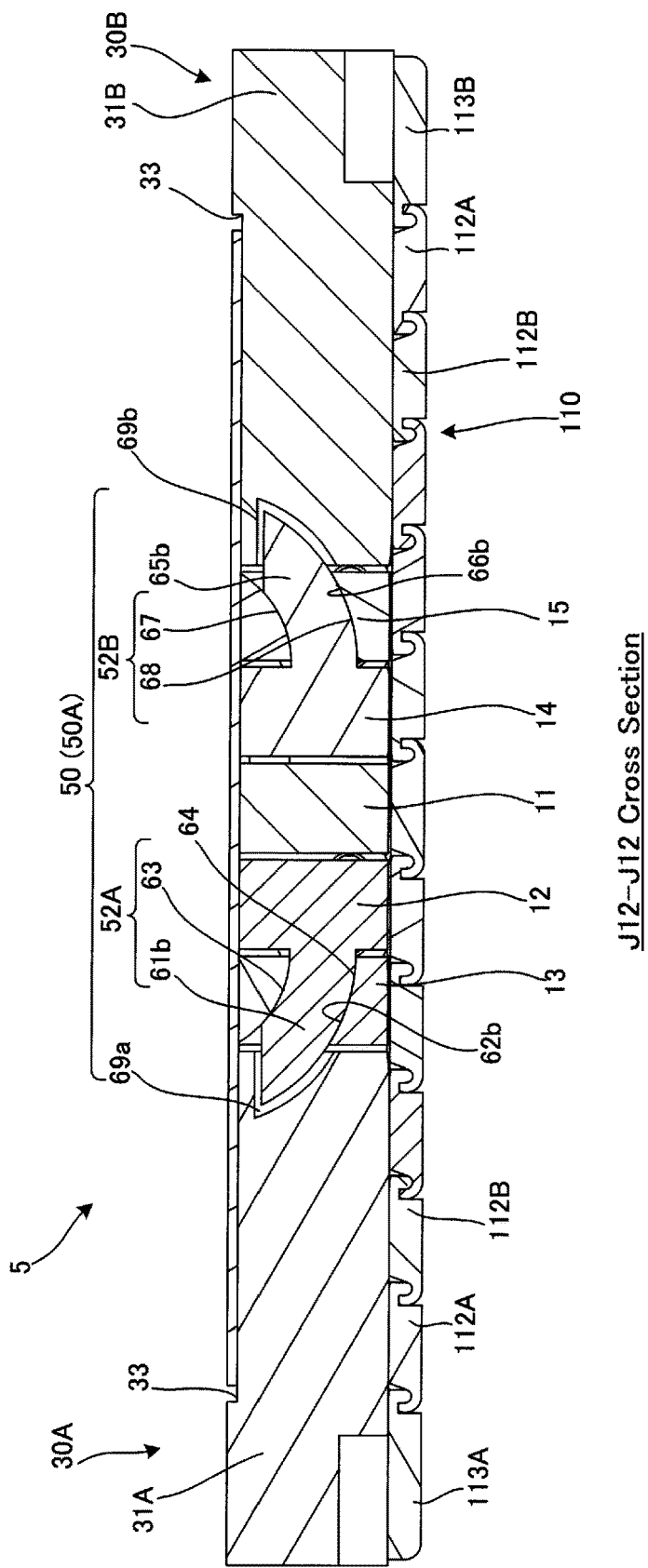
FIG. 10 shows a cross section in line J12-J12 in FIG. 7.

In the opened state shown in FIG. 9 and FIG. 10, FIG. 9 shows a left first articulation joint 51A, a right first articulation joint 51B, a left third articulation joint 53A and a right third articulation joint 53B; and FIG. 10 shows the left second articulation joints 52A and the right second articulation joint 52B. In all articulation joints 51A to 53A; 51B to 53B, the left first to the left third guide hole portions 62a to 62c are engaged with the left first to the left third arc-shaped arms 61a to 61c at the base portion of the latter, and the right first to the right third guide hole portions 66a to 66c with the right first to the right third arc-shaped arms 65a to 65c. In this engaged state, the first base frame 30A, respective vertical frames 11 to 15 of the frame portion 10 and the second base frame 30B are aligned with no gap between them in the right and left direction to be flat.

The left first to the left third arc-shaped arms 61a to 61c and the right first to the right third arc-shaped arms 65a to 65c are engaged with the left first to the left third guide hole portions 62a to 62c and the right first to the right third guide hole portions 66a to 66c in a range from a base portion (at a rotation angle of 0 degree) to a rotation angle slightly greater than 30 degrees. The left first to the left third arc-shaped arms 61a to 61c and the right first to the right third arc-shaped arms 65a to 65c have a length (arc length) longer than the width of vertical frames on which the left first to the left third guide hole portions 62a to 62c and the right first to the right third guide hole portions 66a to 66c are provided. To this end, the insertion holes 69a, 69b (see FIG. 10) being relief holes are formed on the first base frame 30A and the second base frame 30B, wherein the tip portions of the left second arc-shaped arm 61b and the right second arc-shaped arm 65b are inserted into these holes, and the insertion holes 69c, 69d (see FIG. 9) are formed on the left and right left third vertical frame 13, 15, wherein the tip portions of the left first arc-shaped arm 61a and the right second arc-shaped arm 65a are inserted into these holes, once these tip portions have passed through the left first guide hole portion 62a and the right first guide hole portions 66a. The inner circumferential surfaces of the insertion holes 69a, 69b are formed in a shape which forces the tip portions of the left second arc-shaped arm 61b and the right second arc-shaped arm 65b to be slidably engaged with no backlash. Equally, the inner circumferential surfaces of the insertion holes 69c, 69d are formed in a shape which forces the tip portions of the left first arc-shaped arm 61a and the right second arc-shaped arm 65a to be slidably engaged with no backlash.

Reference is briefly made to a structure of a frame portion 10, as well as to an attaching part of an arc-shaped arm and guide hole portion in each vertical frame.

A first vertical frame 11 of a frame portion 10 is made up by coupling seven frame bodies, a first to a seventh frame bodies 21A to 21G in series in a vertical direction, while a left second vertical frame 12 is made up by coupling five frame bodies, an eighth to a twelfth frame bodies 22A to 22E in series in a vertical direction. Still further, a left third vertical frame 13 is made up of a thirteenth to an eighteenth frame bodies 23A to 23F, while a right second vertical frame 14 of a nineteenth to a twenty-third frame bodies 24A to 24E and a right third vertical frame 15 of a twenty-fourth to a twenty-ninth frame bodies 25A to 25F. A fifth frame body 21E, an eleventh frame body 22D, a seventeenth frame body 23E, a twenty-second frame body 24D and a twenty-eighth frame body 25E are length-adjusting frame bodies for adjusting a vertical length of the entire frame portion 10 to a vertical length of a first casing 2 and a second casing 3. Frame bodies respectively making up each vertical frame 11 to 15 are coupled by screws (not shown) screwed from a front surface to a rear surface side.

A left first arc-shaped arm 61a and a right second arc-shaped arm 65a are formed integrally with a first frame body 21A for a first row articulated portion 50A of the first vertical frame 11, and a left first arc-shaped arm 261a and a right first arc-shaped arm 265a with a fourth frame body 21D for a second row articulated portion 50B. A left first arc-shaped arm 361a and a right first arc-shaped arm 365a are formed integrally with a seventh frame body 21G for a third row articulated portion 50C.

A left first guide hole portion 62a is formed on an eighth frame body 22A for a first row articulated portion 50A of a left second vertical frame 12. The left first guide hole portion 62a is formed by fixing by screws (not shown) a left guide block 662b to a left guide hole main body portion 662a formed on an eighth frame body 22A. A left second arc-shaped arm 61b is formed integrally on an eighth frame body 22A. A left second arc-shaped arm 261b is formed integrally on a ninth frame body 22B for a second row articulated portion 50B. A left first guide hole portion 62a is made up of a left guide block 662b on a tenth frame body 22C for a second row articulated portion 50B. A left second arc-shaped arm 361b is formed integrally on a twelfth frame body 22E for a third row articulated portion 50C, and a left first guide hole portion 362a is made up of the left guide block 662b.

A left third arc-shaped arm 61c is formed integrally on a thirteenth frame body 23A for a first row articulated portion 50A of a third vertical frame 13, and an insertion hole 69c formed on the third vertical frame. A left second guide hole portion 62b is formed integrally on a fourteenth frame body 23B for a first row articulated portion 50A. A left guide block 662b is formed integrally on a rear end portion of a fifteenth frame bodies 23C for a second row articulated portion 50B, and a left guide hole main body portion 662a formed integrally on a front end portion of a sixteenth frame bodies 3D for the second row articulated portion 50B. Then, a left second guide hole portion 62b is formed by coupling the fifteenth frame body 23C to the sixteenth frame body 23D. An insertion hole 69c, into which a tip of the left first arc-shaped arm 61a is inserted, is formed on the sixteenth frame bodies 23D. A left first guide hole portion 362a is made up of a left guide block 662b, and a left third arc-shaped arm 361c formed integrally on an eighteenth frame body 23F for a third row articulated portion 50C. Still further, an insertion hole 69f is formed on the eighteenth frame body 23F, wherein a tip portion of the left first arc-shaped arm 361a is inserted into the insertion hole.

A right first guide hole portion 66a is made up of a right guide block 666b on a nineteenth frame body 24A for a first row articulated portion 50A of a right second vertical frame 14. A right second arc-shaped arm 65b is formed integrally on a twentieth frame body 24B for a first row articulated portion 50A. A right second arc-shaped arm 265b is formed integrally on a twenty first frame body 24C for a second row articulated portion 50B, and a right first guide hole portion 266a is made up of a right guide block 666b. A right second arc-shaped arm 365b is formed integrally with a twenty third frame body 24E for a third row articulated portion 50C, and a right first guide hole portion 366a is made up of the right guide block 666b.

A right third arc-shaped arm 65c is formed integrally on a twenty fourth frame body 25A for a first row articulated portion 50A of a right third vertical frame 15, and a right second guide hole portion 66b is made up of the right guide block 666b. The right guide block 666b is formed integrally on a rear end portion of a twenty fifth frame body 25B for a second row articulated portion 50B, a left guide hole main body portion 662a formed integrally on a front end portion of a twenty sixth frame body 25C, and a right second guide hole portion 66b is formed by coupling the twenty fifth frame body 25B to the twenty sixth frame body 25C. A right third arc-shaped arm 65c is formed integrally on a twenty seventh frame body 25D for a second row articulated portion 50B. A right second guide hole portion 366b is made up of the right guide block 666b on a twenty ninth frame body 25F for a third row articulated portion 50C, a right third arc-shaped arm 365c is formed integrally and an insertion hole 69i (see FIG. 18), into which a right first arc-shaped arm 365a is inserted, is formed as well.

On the other hand, a right third guide hole portion 366c with which a right third arc-shaped arm 365c is engaged is made up of a right guide block 666b on a rear second base frame body 32B of a second base frame 30B, and an insertion hole (not shown), into which a tip portion of a right second arc-shaped arm 365b is inserted, is formed as well.

A right third guide hole portion 266c with which a right third arc-shaped arm 265c of a second row articulated portion 50B is slidably engaged is made up of the right guide block 666b on a front second base frame body 31B. Moreover, an insertion hole (not shown), into which a tip portion of a right second arc-shaped arm 265b of the second row articulated portion 50B is inserted is formed on the front second base frame body 31B. Still further, a right third guide hole portion 66c with which a right third arc-shaped arm 65c is slidably engaged is made up of a left guide block 666b on the front second base frame body 31B.

On the other hand, an insertion hole 69g is formed on a front first base frame body 31A of the first base frame 30A, wherein a left second arc-shaped arm 261b of a second row articulated portion 50B is inserted into the insertion hole, and a left third guide hole portion 262c is made up of the left guide block 662b, wherein a left third arc-shaped arm 261c of a second row articulated portion 50B is slidably engaged with the left third guide hole portion. Still further, an insertion hole 69h is formed on the rear first base frame body 32A, wherein a tip portion of a left second arc-shaped arm 361b of a third row articulated portion 50C is inserted into the insertion hole, and a left third guide hole portion 362c is formed, wherein a left third arc-shaped arm 361c is slidably engaged with the left guide hole portion.

A first base frame 30A and a left third vertical frame 13 changes directions and angle of rotation within a predetermined rotation angle range between 0 degree and a maximum rotation angle slightly greater than 30 degrees, by a slide engagement of a left third arc-shaped arm (61c, 261c, 361c) and a left third guide hole portion (62c, 262c, 362c), to expand and contract the gap between a first base frame 30A and the left third vertical frame 13. A left third vertical frame 13 and a left second vertical frame 12 change directions and angle of rotation within the above-mentioned rotation angle range relative to each other by a slide engagement of a left second arc-shaped arm (61b, 2610, 361h) and a left third guide hole portion (62b, 262b, 362b), and the left second vertical frame 12 and the first vertical frame 11 do so by that of a left second arc-shaped arm (61b, 261b, 361b) and a left third guide hole portion (62a, 262a, 362a), to expand and contract the gap between adjacent frames. Further frames such as a right second vertical frame 14 and a right third vertical frame 15 on the right side of the first vertical frame 11 and a second base frame 30B also change directions and angle of rotation within the above-mentioned rotation angle range relative to each other, to make the gap between adjacent frames expandable and contractable.

Articulated portions 50 change directions and angle of rotation of adjacent frames relative to each other along a predetermined trajectory by a slide engagement of arc-shaped arms and guide hole portions, and make the gap between adjacent frames expandable and contractable; they assure a synchronous driving motion for a synchronous driving portion 70, and a stop motion for stopping a shift movement at any position and for holding a gap at a stop position by a first friction click stop portion 90A and a second friction click stop portion 90B. The synchronous driving portion 70 is made up by coupling a plurality of gears along a width direction from a first base frame 30A through a frame portion 10 to a second base frame 30B. When a first base frame 30A and a second base frame 30B are subjected to an opening and closing movement relative to each other by an opening and closing movement of a first casing 2 and a second casing 3 relative to each other, coupling gears on both ends (a front first coupling gear 92A, a rear first coupling gear 93A, a front second coupling gear 92B and a rear second coupling gear 93B fixed to a left third vertical frame 13 and a right third vertical frame 15), which are respectively coupled to a first friction click stop portion 90A and a second friction click stop portion 90B respectively provided on the first base frame 30A and the second base frame 30B, shift to synchronously drive respective gears between them. Next, when a rotation of the coupling gears on both ends stops, the one of the gears between them does so as well, and the respective frames to which the respective gears are attached stop to be held at that position. Furthermore, the coupling gears on both ends are braked by friction force, to apply a resistive force to the opening and closing movement of the first casing 2 and the second casing 3. This resistive force enables the first casing 2 and the second casing 3 to be held by the resistive force at that position in an opening and closing state, even if the first casing 2 and the second casing 3 are stopped in the middle of the opening and closing movement of the first casing 2 and the second casing 3.

<Structure of Synchronous Driving Portion 70>

In FIG. 5B, synchronous driving portion 70 is made up of four synchronous gears of identical structure, i.e. a left first synchronous gear train 71A, a left second synchronous gear train 72A, a right first synchronous gear train 71A and a right second synchronous gear train 72A. The left first synchronous gear train 71A and the left second synchronous gear train 72A comprise respectively a left first synchronous gear portion 80A and a left second synchronous gear portion 80B, while the right first synchronous gear train 71B and the right second synchronous gear train 72B comprise respectively a right first synchronous gear portion 80C and a right second synchronous gear portion 80D. Each of the left first synchronous gear portion 80A, the left second synchronous gear portion 80B, the right first synchronous gear portion 80C and the right second synchronous gear portion 80D is unitized of a left synchronous gear 81 and a right synchronous gear 82 being aligned in a right and left direction along a width direction.

A left first synchronous gear train 71A is arranged between a first vertical frame 11 and a left third vertical frame 13 adjacent to a left second vertical frame 12 on the right and the left in a width direction, centered on a left first synchronous gear portion 80A. A left first synchronous gear portion 80A is arranged on a coupling portion of a ninth frame body 22B and a tenth frame body 22C, both making up the left second vertical frame 12. Bearing holes (not shown) for a front shaft portion 81a of a left synchronous gear 81 and a front shaft portion 82a of a right synchronous gear 82 aligned on the right and left along the width direction are formed on a rear end portion of the ninth frame body 22B. Bearing holes 81c, 82c for a rear shaft portion 81b of the left synchronous gear 81 and a rear shaft portion 82b of the right synchronous gear 82 are formed on a front end portion of the tenth frame body 22C. The ninth frame body 22B and the tenth frame body 22C are fixed to each other by screws (not shown) screwed along the right and left direction to make up a synchronous gear unit for rotatably holding the left synchronous gear 81 and the right synchronous gear 82 meshed with each other.

Figure 11:
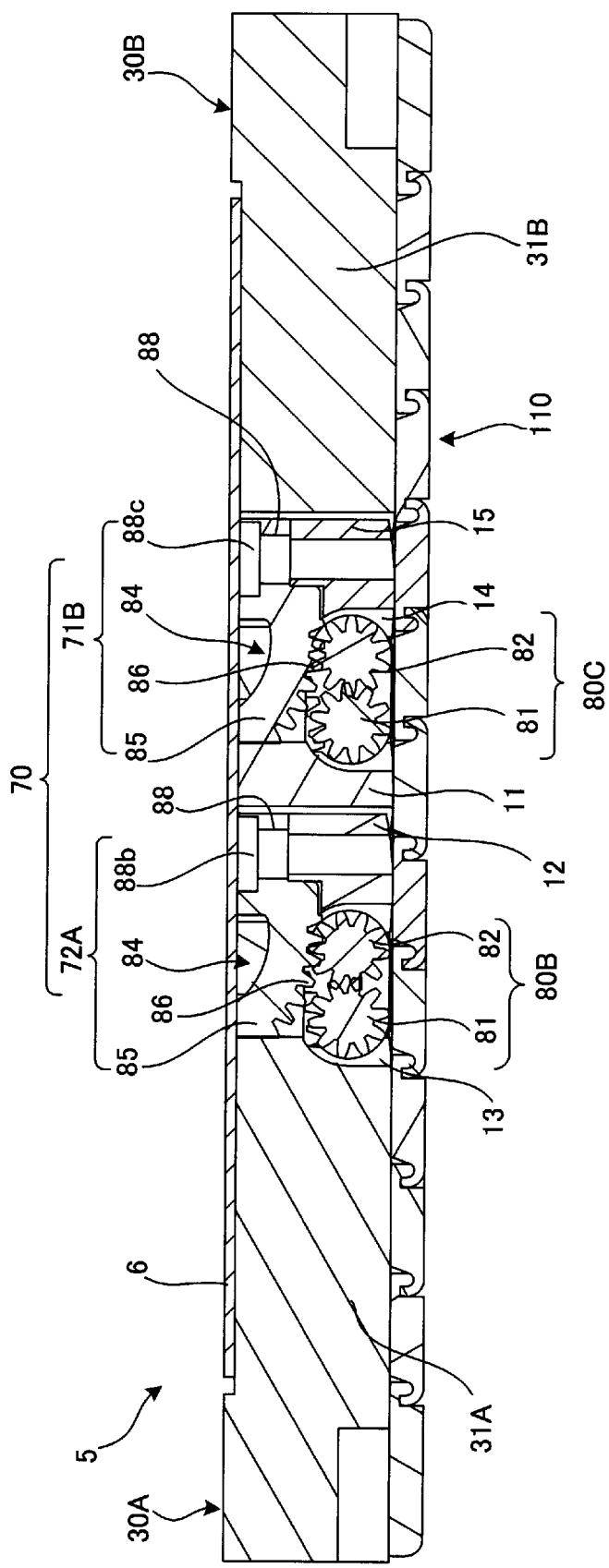
FIG. 11 shows a cross section in line G11-G11 in FIG. 7.
Figure 12:
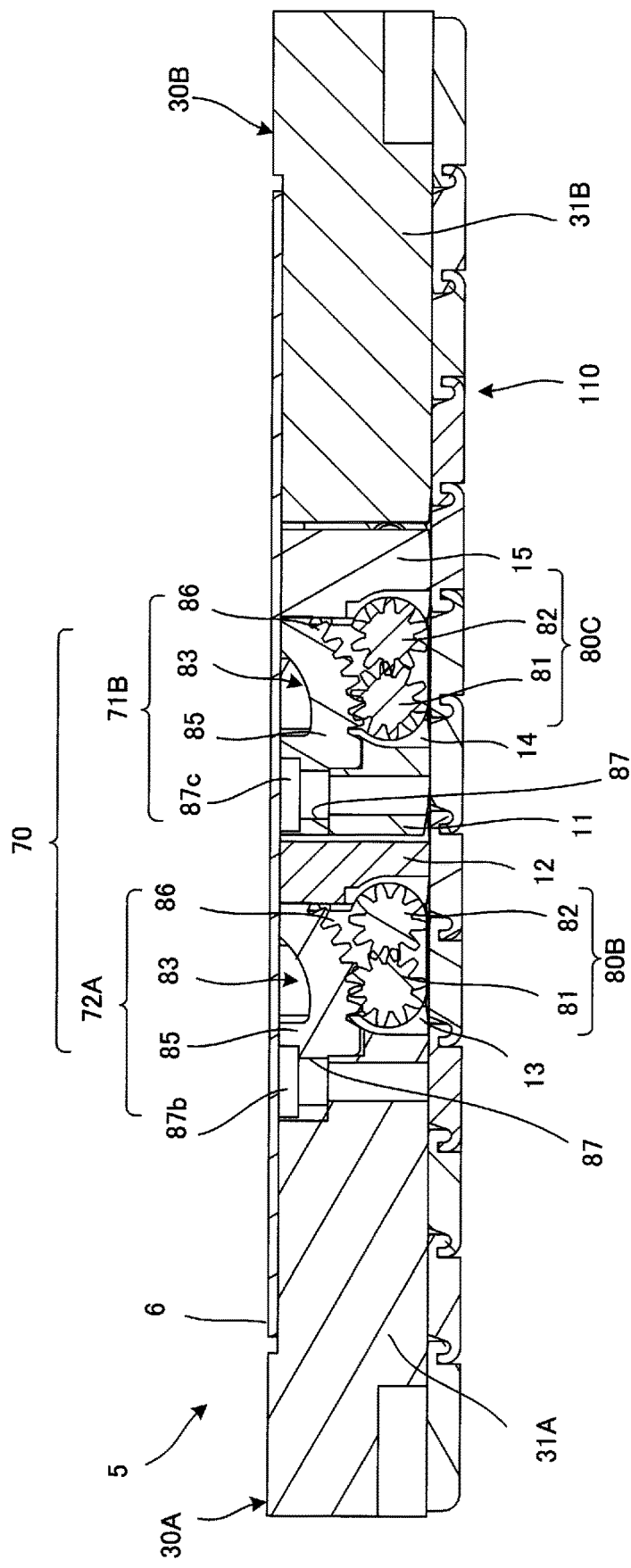
FIG. 12 shows a cross section in line G12-G12 in FIG. 7.

A first arc-shaped gear 83 is meshed with a left synchronous gear 81, while a second arc-shaped gear 84 with a right synchronous gear 82. The first arc-shaped gear 83 and the second arc-shaped gear 84 have symmetrical shapes on the right and left, and as shown in FIG. 11 and FIG. 12, a gear portion 86 is formed on an outer circumferential surface of an arc-shaped gear body 85 bent into a convex shape toward a rear surface side. The first arc-shaped gear 83 and the second arc-shaped gear 84 are arranged to be spaced apart from front to rear in a vertical direction. A screw insertion hole 87 is provided on a left end portion of the first arc-shaped gear 83, and the gear portion 86 extends toward the right. A screw insertion hole 88 is provided on a left end portion of the second arc-shaped gear 84, and the gear portion 86 extends toward the left.

On a left first synchronous gear train 71A, a first arc-shaped gear 83 is fixed by a screw 87a (see FIG. 7) to a sixteenth frame body 23D making up a left third vertical frame 13, and a second arc-shaped gear 84 is fixed by a screw 88a (see FIG. 7) to a third frame body 21C making up a first vertical frame 11.

When the first arc-shaped gear 83 is rotated clockwise integrally with the left third vertical frame 13, a left synchronous gear 81 is rotated counterclockwise, as is the case with a driving operation of rack gear and pinion gear. Here, a rotation angle of the left third vertical frame 13 increases along a predetermined trajectory by a slidable engagement of a left second arc-shaped arm 61b (261b, 361b) and a left second guide hole portion 62b (262b, 362b), the left third vertical frame 13 gradually stands up from a horizontal direction and shifts to expand the gap with a left second vertical frame 12. On the other hand, when a left synchronous gear 81 is rotated counterclockwise, a right synchronous gear 82 is rotated clockwise and a second arc-shaped gear 84 counterclockwise. Therefore, a first vertical frame 11 is rotated counterclockwise relative to the left second vertical frame 12 along a predetermined trajectory by a slidable engagement of left first arc-shaped arms 61a (261a, 361a) and left first guide hole portions 62a (262a, 362a), its rotation angle gradually increases, the first vertical frame 11 stands up from the horizontal direction and shifts to expand the gap with the left second vertical frame 12. Here, if the first vertical frame 11 taken as reference point, the left second vertical frame 12 is rotated clockwise relative to the first vertical frame 11, and the left third vertical frame 13 clockwise relative to the left second vertical frame 12.

On a left second first synchronous gear train 72A, a left second synchronous gear portion 80B is provided as a synchronous gear unit between a thirteenth frame body 23A and a fourteenth frame body 23B, both making up the left third vertical frame 13. A first arc-shaped gear 83 is fixed by a screw 87b (see FIG. 7) to a front first base frame body 31A of a first base frame 30A, and a second arc-shaped gear 84 is fixed by a screw 88b (see FIG. 7) to an eighth frame body 22A making up a left second vertical frame 12.

On a left second first synchronous gear train 72A, when a first casing 2 is rotated in a closing direction, a first base frame 30A is rotated clockwise, a first arc-shaped gear 83 clockwise and a left synchronous gear 81 counterclockwise. Here, a rotation angle of the first base frame 30A increases along a predetermined trajectory by a slidable engagement of a left third arc-shaped arm 61c (261c, 361c) and a left third guide hole portion 62c (262c, 362c), the first base frame 30A gradually stands up from a horizontal direction and shifts to expand the gap with a left third vertical frame 13. On the other hand, when a left synchronous gear 81 is rotated counterclockwise, a right synchronous gear 82 is rotated clockwise and a second arc-shaped gear 84 counterclockwise. Therefore, the left second vertical frame 12 is rotated counterclockwise relative to the left third vertical frame 13 along a predetermined trajectory by a slidable engagement of left second arc-shaped arms 61b (261b, 361b) and left second guide hole portions 62b (262b, 362b), its rotation angle gradually increases, the left third vertical frame 13 stands up from the horizontal direction and shifts to expand the gap with the left, third vertical frame 13. Here, if the left second vertical frame 12 taken as reference point, the left third vertical frame 13 is rotated clockwise relative to the left second vertical frame 12. A clockwise turning force of the left first synchronous gear train 71A relative to the left second vertical frame 12 is transferred via the left second synchronous gear portion 80B of the left second first synchronous gear train 72A.

Next, reference is made to a right first synchronous gear train 71B and a right second synchronous gear train 72B. The right first synchronous gear train 71B and the right second synchronous gear train 72B have a structure substantially identical to a left first synchronous gear train 71A and a left second first synchronous gear train 72A as described above, except the former are arranged at a position point-symmetric to the latter, if a center of a front half part of a first vertical frame 11 in a vertical direction taken as reference point.

A right first synchronous gear train 71B arranges a right first synchronous gear portion 80C on a coupling portion of a nineteenth frame body 24A and a twentieth frame body 24B of a right second vertical frame 14, and fixes a first arc-shaped gear 83 is by a screw 87c (see FIG. 7) to a second frame body 21B of a first vertical frame 11. A second arc-shaped gear 84 is fixed by a screw 88c (see FIG. 7) to a twenty fourth frame body 25A of a right third vertical frame 15.

When a right third vertical frame 15 is rotated counterclockwise, a second arc-shaped gear 84 is rotated counterclockwise, a right synchronous gear 82 clockwise and a left synchronous gear 81 counterclockwise. Then, a first arc-shaped gear 83 fixed to a first vertical frame 11 meshed with the left synchronous gear 81 is rotated clockwise. Therefore, a right second vertical frame 14 is rotated clockwise relative to the right third vertical frame 15 along a predetermined trajectory by a slidable engagement of a right second arc-shaped arm 65b (265b, 365b) and a right first guide hole portion 66b (266b, 366b). As the first arc-shaped gear 83 is rotated clockwise, the first vertical frame 11 is rotated clockwise relative to the right second vertical frame 14.

On the contrary, as seen from a first vertical frame 11, a right second vertical frame 14 is rotated counterclockwise along a predetermined trajectory by a slidable engagement of a right first arc-shaped arm 65a (265a, 365a) and a right first guide hole portion 66a (266a, 366a). Here, a rotation angle of the right second vertical frame 14 increases, the right second vertical frame 14 gradually stands up from a horizontal direction and shifts to expand the gap with the first vertical frame 11. A right third vertical frame 15 is rotated counterclockwise relative to the right second vertical frame 14 along a predetermined trajectory by a slidable engagement of a right second arc-shaped arm 65h (265b, 365b) and a right first guide hole portion 66h (266h, 366b). Here, a rotation angle of the right third vertical frame 15 increases, the right third vertical frame 15 gradually stands up from a horizontal direction and shifts to expand the gap with the right second vertical frame 14.

A right second synchronous gear train 72B arranges a right second synchronous gear portion 80D on a coupling portion of a twenty-sixth frame body 25C and a twenty-seventh frame body 25D of a right third vertical frame 15, and fixes a first arc-shaped gear 83 by a screw 87d (see FIG. 7) to a second frame body 24C of a right second vertical frame 14. A second arc-shaped gear 84 is fixed by a screw 88d (see FIG. 7) to a front base frame body 31B of a second base frame 30.

On the other hand, when a second base frame 30B is rotated counterclockwise, a second arc-shaped gear 84 is rotated counterclockwise, a right synchronous gear 82 clockwise and a left synchronous gear 81 counterclockwise. Then, a first arc-shaped gear 83 fixed to a right second vertical frame 14 meshed with a left synchronous gear 81 is rotated clockwise. Therefore, a right third vertical frame 15 is rotated counterclockwise relative to the second base frame 30B along a predetermined trajectory by a slidable engagement of a right third arc-shaped arm 65c (265c, 365c) and a right third guide hole portion 66c (266c, 366c). As the first arc-shaped gear 83 is rotated clockwise, the right second vertical frame 14 is rotated clockwise relative to the right third vertical frame 15.

On the contrary, as seen from the right second vertical frame 14, the right third vertical frame 15 is rotated counterclockwise along a predetermined trajectory by a slidable engagement of a right second arc-shaped arm 65b (265b, 365b) and a right second guide hole portion 66b (266b, 366b). Here, a rotation angle of the right third vertical frame 15 increases, the right third vertical frame 15 gradually stands up from a horizontal direction and shifts to expand the gap with the right second vertical frame 14. Therefore, the left second vertical frame 12 is rotated counterclockwise relative to the right third vertical frame 15 along a predetermined trajectory by a slidable engagement of a right third arc-shaped arm 65c (265c, 365c) and a right third guide hole portion 66c (266c, 366c). Here, a turning angle of the second base frame 30B increases, the second base frame 30B gradually stands up from a horizontal direction and shifts to expand the gap with the right third vertical frame 15. A clockwise turning force of the right first synchronous gear train 71B relative to the right third vertical frame 15 is transferred via the right second synchronous gear portion 80D of the right first synchronous gear train 71B.

In a description of left and right, first and second synchronous gear trains 71A, 71B, 72A, 72B, reference is also made to application of a turning force to first and second base frames 30A, 30B to show that these are rotated relative to each other; this applies for example to the case that a second casing 3 is in a resting state, while a first casing 2 is opened and closed. When an opening and closing force is applied to both the first casing 2 and the second casing 3, a turning force as accompanied with an opening and closing motion of the first base frame 30A and the second base frames 30B is applied from left and right third vertical frames 13, 15 to left and right second vertical frames 12, 14 respectively.

A synchronous gear train 73 having the same structure as first synchronous gear train 71A is provided on rear end portions in a vertical direction respectively of a first vertical frame 11 and left and right second vertical frames 12, 14. The synchronous gear train 73 is arranged on a coupling portion to a sixth frame body 21F and a seventh frame body 21G of the first vertical frame 11 to fix a first arc-shaped gear 83 by a screw 87e (see FIG. 7) to a twelfth frame body 22E making up a left second vertical frame 12, as well as a second arc-shaped gear 84 by a screw 88e (see FIG. 7) to a twenty third frame body 24E making up a right second vertical frame 14. The synchronous gear train 73 functions as a frame holding portion for holding the first vertical frame 11, and the left and right second vertical frames 12, 14 following shift trajectories of a left first articulation joint 51A and a right first articulation joint 51B along their respective predetermined shift trajectories, with no rattling.

Left and a right, first and second synchronous gear portions 80A to 80D of a synchronous driving portion 70 are subjected to gear-coupling to each other in series by a first arc-shaped gear 83 and a second arc-shaped gear 84, and each of the gears is fixed to each frame of frame rows (which means a first base frame 30A, respective vertical frames 11 to 15 of a frame portion 10 and a second base frame 30B which are all arranged in parallel to each other). This prevents each frame of the frame rows from individually shifting other than gear drive of the synchronous driving portion 70.

<Structure of Friction Click Stop Portion (Stop Holding Portion)>

Figure 6:
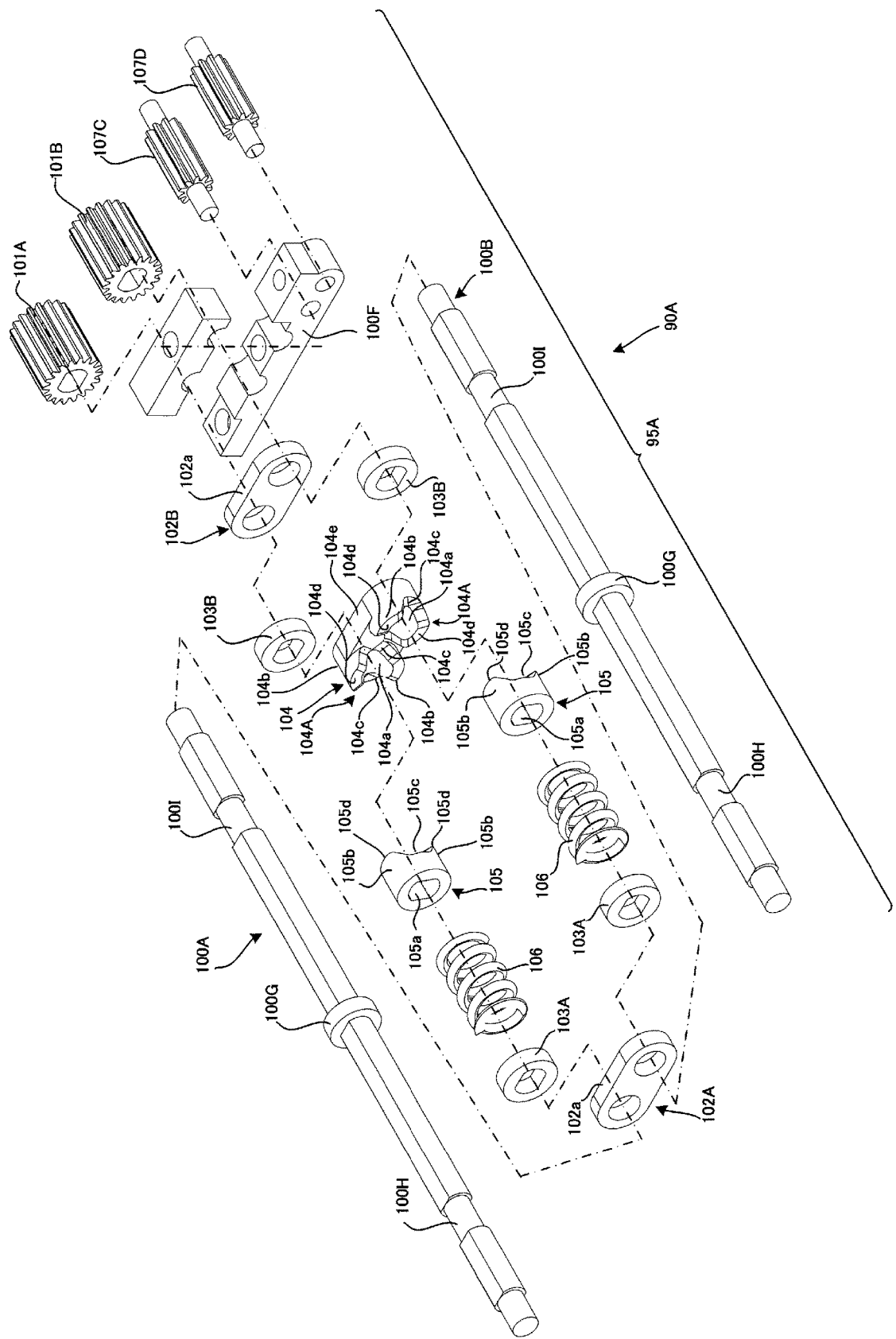
FIG. 6 is an exploded perspective view showing a part of a first friction click stop mechanism shown in FIG. 5A.

In FIG. 5C and FIG. 6, a first friction click stop portion 90A and a second friction click stop portion 90B are provided symmetrically on the right and left on a rear end portion in a vertical direction, centered on a central shaft line L along the vertical direction of a first vertical frame 11. The first friction click stop portion 90A comprises a first friction click stop mechanism 91A provided on a rear first base frame 32A of a first base frame 30A, a front first coupling gear 92A and a rear first coupling gear 93A fixed respectively to the front and the rear of an eighteenth frame body 23F making up a left third vertical frame 13. The second friction click stop portion 90B comprises a second friction click stop mechanism 91B provided on a rear second base frame 32B of a second base frame 30B, a front second coupling gear 92B and a rear second coupling gear 93B fixed respectively to the front and the rear of a twenty ninth frame body 25F making up a right second vertical frame 15. The front first coupling gear 92A and the rear first coupling gear 93A are formed in an arc shape similar to a second arc-shaped gear 84, while the front second coupling gear 92B and the rear second coupling gear 93B in an arc shape similar to a first arc-shaped gear 83.

In this embodiment, a first friction click stop mechanism 91A is composed of two units, i.e. a front first unit 94A and a rear first unit 95A, while a second friction click stop mechanism 91B of two units, i.e. a front second unit 94B and a rear second unit 95B; both are structured in an identical structure, symmetrical on the right and the left. Furthermore, a front first coupling gear 92A and the rear first coupling gear 93A are provided in correspondence with the two units, i.e. the front first unit 94A and the rear first unit 95A, while a front second coupling gear 92B and a rear second coupling gear 93B in correspondence with the two units, i.e. the front second unit 94B and the rear second unit 95B.

A first friction click stop mechanism 91A pivotally supports a first driving shaft 100A and a second driving shaft 100B between a front end bearing portion 100C and a rear end bearing portion 100D, as well as on an intermediate area by a front intermediate bearing portion 100E and a rear intermediate bearing portion 100F. The front end bearing portion 100C, the rear end bearing portion 100D, the front intermediate bearing portion 100E and the rear intermediate bearing portion 100F are fixed on a rear surface side (an inner surface side) of a rear first base frame 32A by screws (not shown).

A first driving shaft 100A and a second driving shaft 100B have an identical structure, in that they are formed in so-called two surface width shape, having two opposed surfaces of columnar shaft portions (which have maximum outer diameters) as parallel surfaces, wherein a flange portion 100G is formed on a central area in an axial direction. A front first unit 94A is provided on a front side, and a rear first unit 95A on a rear side, symmetrically in a front and rear direction across a boundary of the flange portion 100G. Small diameter shaft portions 100H, 100I pivotally supported by the front intermediate bearing portion 100E and the rear intermediate bearing portion 100F are formed on the first driving shaft 100A and the second driving shaft 100B. The small diameter shaft portions 100H, 100I have smaller diameters than the maximum outer diameters of the first driving shaft 100A and the second driving shaft 100B.

A left synchronous gear 101A and a right synchronous gear 101B meshed with each other, as is the case with a left first synchronous gear portion 80A are non-rotatably mounted on both end portions of small diameter shaft portions 100H, 100I. Shaft holes of the left synchronous gear 101A and the right synchronous gear 101B are formed to conform to two surface widths of the first driving shaft 100A and the second driving shaft 100B.

A front first unit 94A is configured to ensure that in a first driving shaft 100A and a second driving shaft 100B, a first common friction plate 102A, a left and a right first friction plates 103A, 103A, a common click plate 104, a left and a right click bodies 105, 105, a left and a right compression springs 106, 106, a left and a right second friction plates 103B, 103B and a second common friction plate 102B are arranged in order from a front side between a front intermediate bearing portion 100E and a flange portion 100G. Shaft holes of the first and the second common friction plates 102A, 102B and the common click plate 104 are formed in the circular shape having the maximum outer diameter, while shaft holes of the left and the right first friction plates 103A, 103A, the left and the right click bodies 105, 105, in the shape conforming to two surface widths of the first driving shaft 100A and the second driving shaft 100B. The left and the right click bodies 105, 105 have adequately larger diameters than the maximum outer diameters of the first driving shaft 100A and the second driving shaft 100B.

Top surfaces 102a, 104e in a front surface and a rear surface direction of the first and the second common friction plates 102A, 102B and the common click plate 104 are formed on a flat surface to abut against a ceiling surface on a rear surface side of a rear first base frame body 32A. Therefore, even if a rotation force of the first driving shaft 100A and the second driving shaft 100B about an axis is applied to the first and the second common friction plates 102A, 102B and the common click plate 104, rotations of the first and the second common friction plates 102A, 102B and the common click plate 104 are stopped.

A rear first unit 95A is configured to ensure that in a first driving shaft 100A and a second driving shaft 100B, a second common friction plate 102B, a left and a right second friction plates 103B, 103B, a common click plate 104, a left and a right click bodies 105, 105, a left and a right compression springs 106, 106, a left and a right first friction plates 103A, 103A and a first common friction plate 102B, are arranged in order from a rear side toward a front side between a rear intermediate bearing portion 100F and a flange portion 100G, as shown in FIG. 6.

A first common friction plate 102A and a left and a right first friction plates 103A, 103A, and a common click plate 104 and a left and a right click bodies 105, 105 and of a left and a right second friction plates 103B, 103B and a second common friction plate 102B are under a pressurized contact by spring forces of a left and the right compression springs 106, 106. The left and the right first friction plates 103A, 103A as well as the left and the right second friction plates 103B, 103B are under a friction contact with the first common friction plate 102A and the second common friction plate 102B to apply a friction force as the left and the right first friction plates 103A, 103A are rotated by a rotation of a first driving shaft 100A and a second driving shaft 100B.

Cam portions 104A, 104A are formed on a common click plate 104 extending toward a left and a right click bodies 105, 105, wherein convex portions 104b and concave portions 104c are alternately formed respectively at an angular interval of 90 degrees about axes of shaft holes 104a, 104a into which a first driving shaft 100A and a second driving shaft 100B are inserted. Tip portions 104d of the convex portions 104b are formed into flat surfaces.

Click projection portions 105b and concave portions 105c are alternately formed respectively at an angular interval of 90 degrees about axes of shaft holes 105a on a left and a right click bodies 105, 105 extending toward convex portions 104b of cam portions 104A. Tip portions 105d of the click projection portions 105b are formed into flat surfaces. On the left and a right click bodies 105, 105, a click projection portion 105b rotatably shifts between a convex portion 104b and a concave portion 104c of a cam portion 104A at a closed position and an opened position. A first driving shaft 100A and a second driving shaft 100B are rotated 90 degrees between an opened position and a closed position. For example, as shown in FIG. 6, the click projection portion 105b shifts from the closed position where it is interstitially inserted into the concave portion 104c of the cam portion 104A to the opened position where it abuts against a tip portion 104d of a convex portion 104b.

A first input gear 107A and a second input gear 107B formed in a shaft shape and meshed with each other are aligned in a right and left direction between a front end bearing portion 100C and a front intermediate bearing portion 100E, while a third input gear 107C and a fourth input gear 107D formed in a shaft shape are aligned along a right and left direction between a rear end bearing portion 100D and a rear intermediate bearing portion 100F. The first input gear 107A is meshed with a right synchronous gear 101B of a front first unit 94A, while the second input gear 107B with a front first coupling gear 92A. The third input gear 107C is meshed with a right synchronous gear 101B of a rear first unit 95A, while the fourth input gear 107D is meshed with a rear first coupling gear 93A. As a rotation is transferred to the second input gear 107B and the fourth input gear 107D by the front first coupling gear 92A and the rear first coupling gear 93A, respective right synchronous gears 101B of the front first unit 94A and the rear first unit 95A are rotated via the first input gear 107A and the third input gear 107C to assure a synchronous rotation of respective left synchronous gears 101A. As the left and the right synchronous gears 101A, 101B are rotated, the first driving shaft 100A and the second driving shaft 100B are rotated. Four respective first and second friction plates 103A, 103B are under a friction contact with first and second common friction plates 102A, 102B to apply a friction braking force to a rotation force on the first driving shaft 100A and the second driving shaft 100B. Still further, when tip portions 105d of the click projection portions 105b of a left and a right click bodies 105, 105 ride on respective tip portions 104d of respective convex portions 104b of a common click plate 104, a click feeling is obtained.

A second friction click stop portion 90B has a structure identical to a first friction click stop portion 90A, both being symmetrically structured about a first vertical frame 11 and having the same effect, so that the same elements have the same reference numerals and no explanation is made to the former. A first input gear 107A, a second input gear 107B, a left and a right synchronous gears 101A, 101B make up an input gear, and similarly a third input gear 107C, a fourth input gear 107D, a left and a right synchronous gears 101A, 101B make up an input gear.

<Structure of Back Side Cover Portion 110>

An articulated hinge device 5 is configured to ensure that a back side cover portion 110 is provided on a back side of a frame portion 10 that covers the frame portion 10 being an outer surface side of a notebook PC 1. The back side cover portion 110 is configured to ensure that an outer vertical cover plate 112A and an inner vertical cover plate 112B are alternately aligned in a symmetry on the right and left centered on a central vertical cover plate 111 in the center in a width direction, while a left end vertical cover plate 113A is added at the left end in the width direction and a right end vertical cover plate 113B at the right end in the width direction. These vertical cover plates (111, 112A, 112B, 113A, 113B) are formed in the shape of strips short in the width direction and elongated along a vertical direction, wherein short piece portions 114 respectively project perpendicular from both ends of the vertical direction toward a front surface. The inner vertical cover plate 112B and the left and the right vertical cover plates 113A, 113B have an equal length in a vertical direction such that they sink in slightly inwardly in the vertical direction from the short piece portions 114 on both ends of the outer vertical cover plate 112A. Moreover, where the vertical cover plates (111, 112A, 112B, 113A, 113B) are arranged in parallel in the width direction, each short piece portion 114 of the outer vertical cover plate 112A is located further outward from each short piece portion 114 of adjacent cover plates, i.e. inner vertical cover plates 112B on both sides, the left end vertical cover plate 113A and the right end vertical cover plate 113B. Therefore, when a frame portion 10 changes its form into a bent state and a flat state between a closed state shown in FIG. 3 and an opened state shown in FIG. 4, adjacent short piece portions 114 do not interfere with each other, but do shield the inside of an articulated hinge device 5 from the outside to prevent dust from entering.

As shown in FIG. 5D and FIG. 9, a central vertical cover plate 111, an outer vertical cover plate 112A and an inner vertical cover plate 112B are configured to ensure that respectively first engagement groove 115 are formed along a vertical direction on a left lateral edge in a width direction to have an opening toward a rear surface side, while second engagement groove 116 formed along a vertical direction on a right lateral edge in a width direction to have an opening toward a front surface side. A left end vertical cover plate 113A is configured to ensure that a first engagement groove 115 is formed on a right lateral edge, and a right end vertical cover plate 113B is configured to ensure that a first engagement groove 115 is formed on a left lateral edge. These vertical cover plates (111, 112A, 112B, 113A, 113B) are configured to ensure that the first engagement groove 115 and the second engagement groove 116 are engaged with each other, and that the vertical cover plates (111, 112A, 112B, 113A, 113B) adjacent about the axial line in a vertical direction are freely rotatable.

As shown in FIG. 5D, a screw hole 117 is formed on a fitting convex portion 118 on front surfaces of both end portions in a vertical direction of a central vertical cover plate 111, and the central vertical cover plate 111 is fixed on a first vertical frame 11 by screwing a screw 212 (see FIG. 7) into the screw hole 117, as the screw is inserted into a front end portion of the first vertical frame 11 of a frame portion 10. Respective fitting convex portions 118 are formed on front surfaces of both end portions in a vertical direction of an outer vertical cover plate 112A and an inner vertical cover plate 112B, wherein the fitting convex portions project from the front surfaces toward inner surfaces. Fitting concave portions 119 are formed on rear surfaces of both end portions in the vertical direction of the first vertical frame 11, left and right second vertical frames 12, 14 and left and right third vertical frames 13, 15 of the frame portion 10. The fitting convex portions 118 are fitted to be non-displaceable in the vertical direction relative to fitting concave portions 119, and freely slidable along a right and left direction. Therefore, a vertical shift of the central vertical cover plate 111, the outer vertical cover plate 112A and the inner vertical cover plate 112B is restricted. It is noted that since the central vertical cover plate 111 is fixed by the screw 12 to the first vertical frame 11, the first vertical frame 11 does not shift relative to the central vertical cover plate 111.

A left slide engagement piece 120 and a right slide engagement piece 121 are respectively formed from tips of short piece portions 114 provided on both end portions in a vertical direction of a left end vertical cover plate 113A and a right end vertical cover plate 113B toward an inner side in a vertical direction. As shown in FIG. 5B, the left slide engagement piece 120 is slidably engaged with left groove 122 of small width respectively formed on both end surfaces in the vertical direction of a first base frame 30A to extend in a width direction. Furthermore, the right slide engagement piece 121 is slidably engaged with right groove 123 of small width respectively formed on both end surfaces in the vertical direction of a second base frame 30B to extend in a width direction.

In a closed state shown in FIG. 3, a left and a right slide engagement pieces 120, 121 are engaged with left groove 122 and right groove 123 at their inner end portions, and in an opened state shown in FIG. 4, a left and a right slide engagement pieces 120, 121 are engaged with left groove 122 and right groove 123 at their outer end portions. While a total length (length in a width direction) of a frame portion 10 varies by effects of articulated portions 50 in accordance with an opening and closing operation of a first casing 2 and a second casing 3, a length in a width direction of a back side cover portion 110 remains constant. In order to absorb the variations in total length of the frame portion 10, the back side cover portion 110 slides the left and the right slide engagement pieces 120, 121 relative to the left groove 122 and the right groove 123.

Next, reference is made to the opening and closing operation of the articulated hinge device 5 structured as mentioned above, based on FIG. 7 to FIG. 31.

Figure 8:
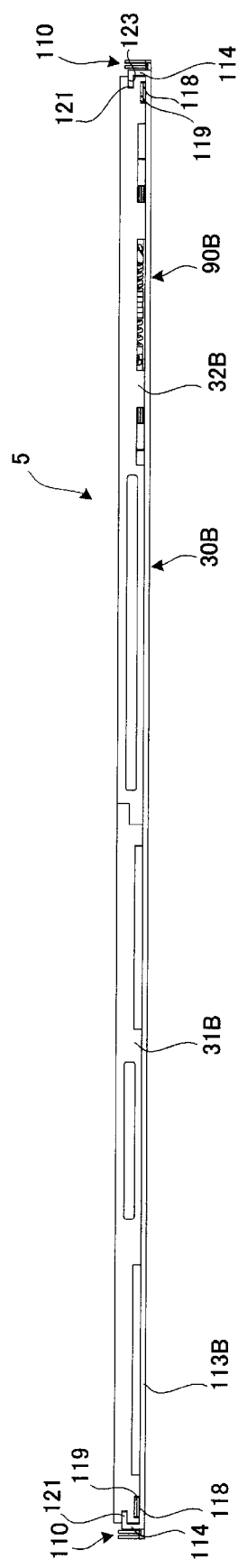
FIG. 8 shows a top view of an articulated hinge device as shown in FIG. 7.

FIG. 7 shows a top view of the articulated hinge device 5 in the opened state, the support sheet 6 being removed. As shown in FIG. 8, the articulated hinge device 5 is configured to be less thick in the opened state.

Where the first vertical frame 11 is arranged at the center in the width direction in FIG. 7, the first vertical frame 11, the left second vertical frame 12, the left third vertical frame 14 and the first base frame 30A are held in a state, wherein their lateral surfaces are in contact with no gap in the width direction. Similarly, the first vertical frame 11, the right second vertical frame 14, the right third vertical frame 15 and the second base frame 30B are held in a state, wherein their lateral surfaces are in contact with no gap in the width direction. In the opened state, the surface levels of these adjacent frames have no difference and no irregularities.

Figure 13:
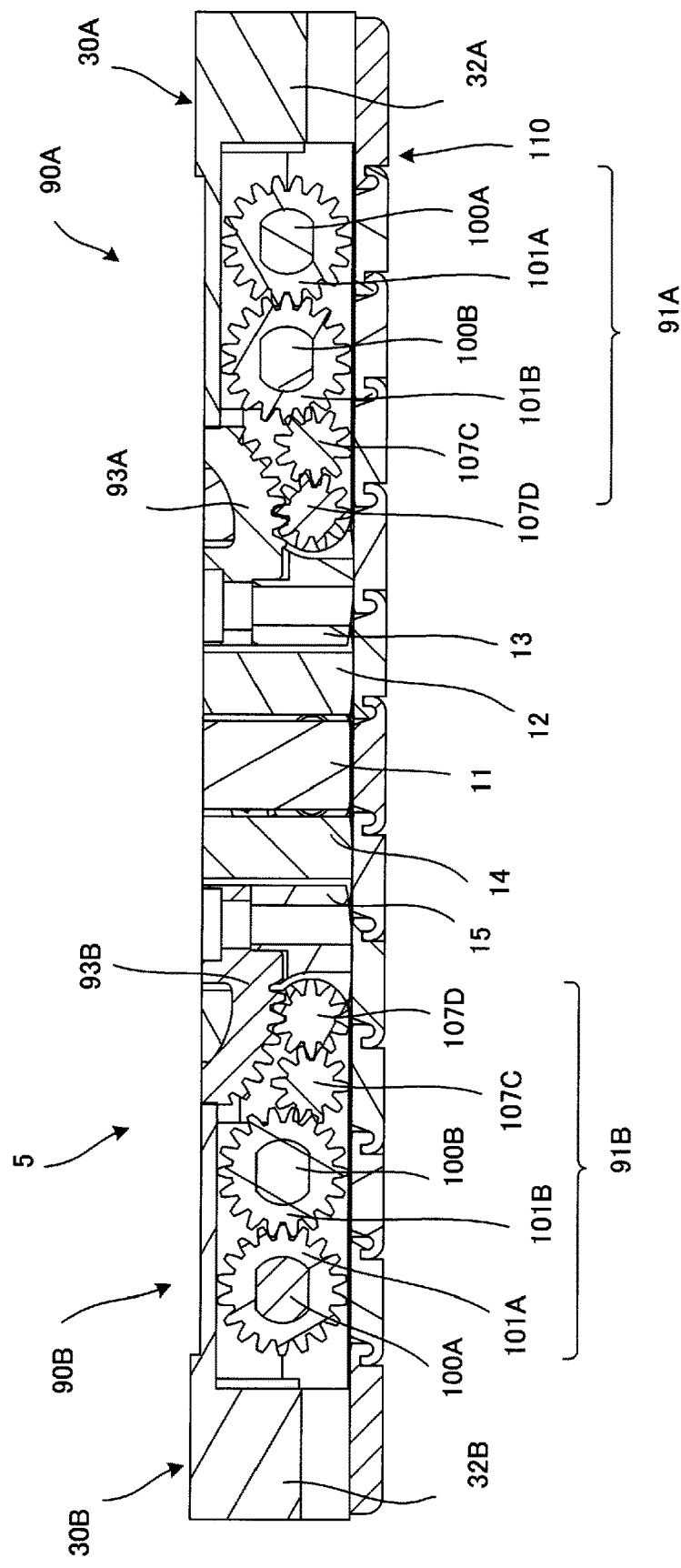
FIG. 13 shows a cross section in line G13-G13 in FIG. 7.

In FIG. 7, the cross section taken in arrows J11-J11 shows the left and the right first articulation joints 51A, 51B and the third articulation joints 53A, 53B of the first row articulated portion 50A in the opened state, as shown in FIG. 9. The cross section taken in arrows J12-J12 shows the left and the right second articulation joints 52A, 52B, as shown in FIG. 10. The cross section taken in arrows G11-G11 shows the meshing position of the second arc-shaped gear 84, and the right synchronous gear 82 in the left second synchronous gear train 72A, as well as the meshing position of the second arc-shaped gear 84 and the right synchronous gear 82 in the right first synchronous gear train 71B, as shown in FIG. 11. The cross section taken in arrows G12-G12 shows the meshing position of the first arc-shaped gear 83 and the left synchronous gear 81 in the left second synchronous gear train 72A, as well as the meshing position of the first arc-shaped gear 83 in and the left synchronous gear 81 in the right first synchronous gear train 71B, as shown in FIG. 12. The cross section taken in arrows G13-G13 shows the meshing position of the fourth input gear 107D and the rear first coupling gear 93A of the rear first unit 95A in the first friction click stop portion 90A, as well as the meshing position of the fourth input gear 107D and the rear second coupling gear 93B of the rear second unit 95B in the second friction click stop portion 90B, as shown in FIG. 13. It is noted that the cross sections shown in FIG. 9 to FIG. 13 facilitate an understanding of structure by displaying the length in thickness direction of the articulated hinge device 5 twice as long as the length magnified at the same magnification level as remaining elements. The cross sections shown in FIG. 16 to FIG. 21, FIG. 24 to FIG. 29 have the same magnification level.

As shown in FIG. 9, respective pairs of the first vertical frame 11 and the left second vertical frame 12, of the left second vertical frame 12 and the left third vertical frame 13, and of the left third vertical frame 13 and the first base frame 30A are aligned with no gap horizontally in the width direction, on the left side in the width direction based on the first vertical frame 11. Respective pairs of the first vertical frame 11 and the right second vertical frame 14, of the right second vertical frame 14 and the right third vertical frame 15, and of the right third vertical frame 15 and the right base frame 30B are aligned with no gap horizontally in the width direction, on the right side in the width direction based on the first vertical frame 11.

The left first guide hole portion 62a provided on the left second vertical frame 12 is engaged with an area toward the base portion of the left first arc-shaped arm 61a extending from the first vertical frame 11 toward the left. In this state, the turning angle of the left second vertical frame 12 is 0 degree. The tip portion of the left first arc-shaped arm 61a is inserted into the insertion hole 69c provided on the left third vertical frame 13 to avoid the interference with the left third vertical frame 13. The right first guide hole portion 66a provided on the right second vertical frame 14 is engaged with an area toward the base portion of the right first arc-shaped arm 65a extending from the first vertical frame 11 toward the right. In this state, the turning angle of the right second vertical frame 14 is 0 degree. The tip portion of the right first arc-shaped arms 65a is inserted into the insertion hole 69d provided on the right third vertical frame 15 to avoid the interference with the right third vertical frame 15.

The left third guide hole portion 62c provided on the first base frame 30A is engaged with an area toward the base portion of the left third arc-shaped arm 61c extending from the left third vertical frame 13 toward the left. In this state, the turning angle of the first base frame 30A is 0 degree. The right third guide hole portion 66c provided on the second base frame 30B is engaged with an area toward the base portion of the right third arc-shaped arm 65c extending from the right third vertical frame 15 toward the right. In this state, the turning angle of the second base frame 30B is 0 degree. In other words, no turning force in a closing direction is applied to the first base frame 30A and the second base frame 30B.

Furthermore, as shown in FIG. 10, the left second guide hole portion 62b provided on the left third vertical frame 13 is engaged with an area toward the base portion of the left second arc-shaped arm 61b extending from the left second vertical frame 12 toward the left. In this state, the turning angle of the left third vertical frame 13 relative to the left second vertical frame 12 is 0 degree. The tip portion of the left second arc-shaped arm 61b is inserted into the insertion hole 69a provided on the first base frame 30A to avoid the interference with the first base frame 30A. Similarly, the right second guide hole portion 66b provided on the right third vertical frame 15 is engaged with an area toward the base portion of the right second arc-shaped arm 65b extending from the right second vertical frame 14 toward the right. In this state, the turning angle of the right third vertical frame 15 relative to the right second vertical frame 14 is 0 degree. The tip portion of the right second arc-shaped arm 65b is inserted into the insertion hole 69b provided on the second base frame 30B to avoid the interference with the second base frame 30B.

The tip portions of the left and the right arc-shaped arms 61a, 65a are formed into flat surfaces, and the flat tip portions of the left and the right arc-shaped arms 61a, 65a abut against the opening edges of the insertion holes 69a to 69d to have a function of preliminary stopper and to maintain the horizontal state.

As shown in FIG. 11, the left second synchronous gear train 72A is configured to ensure that the second arc-shaped gear 84 provided on the left second vertical frame 12 is meshed with the right synchronous gear 82 of the left second synchronous gear portion 80B provided on the left third vertical frame 13 in the opened state. The right first synchronous gear train 71B is configured to ensure that the second arc-shaped gear 84 provided on the right third vertical frame 15 is meshed with the right synchronous gear 82 of the right first synchronous gear portion 80C provided on the right second vertical frame 14. The second arc-shaped gear 84 is meshed at its base portion with the right synchronous gear 82.

The left synchronous gear 81 of the left second synchronous gear train 72A and the respective left synchronous gears 81 of the right first synchronous gear train 71B shown in FIG. 11 are meshed with the first arc-shaped gear 83 fixed to the first base frame 30A and the first arc-shaped gear 83 fixed to the first vertical frame 11, as shown in FIG. 12. The base portion of the first arc-shaped gear 83 is meshed with the left synchronous gear 81.

Furthermore, in the opened state, the rear first coupling gear 93A is meshed at its base portion with the fourth input gear 107D of the rear first unit 95A in the first friction click stop portion 90A, as shown in FIG. 13. Similarly, the rear second coupling gear 93B is meshed at its base portion with the fourth input gear 107D of the rear second unit 95B in the second friction click stop portion 90B. In this opened state, the cam portions 104A of the common click plate 104 and the left and the right click bodies 105 assure the state in which the click projection portions 105b are fitted into the concave portions 104c of the cam portions 104A.

Figure 30:
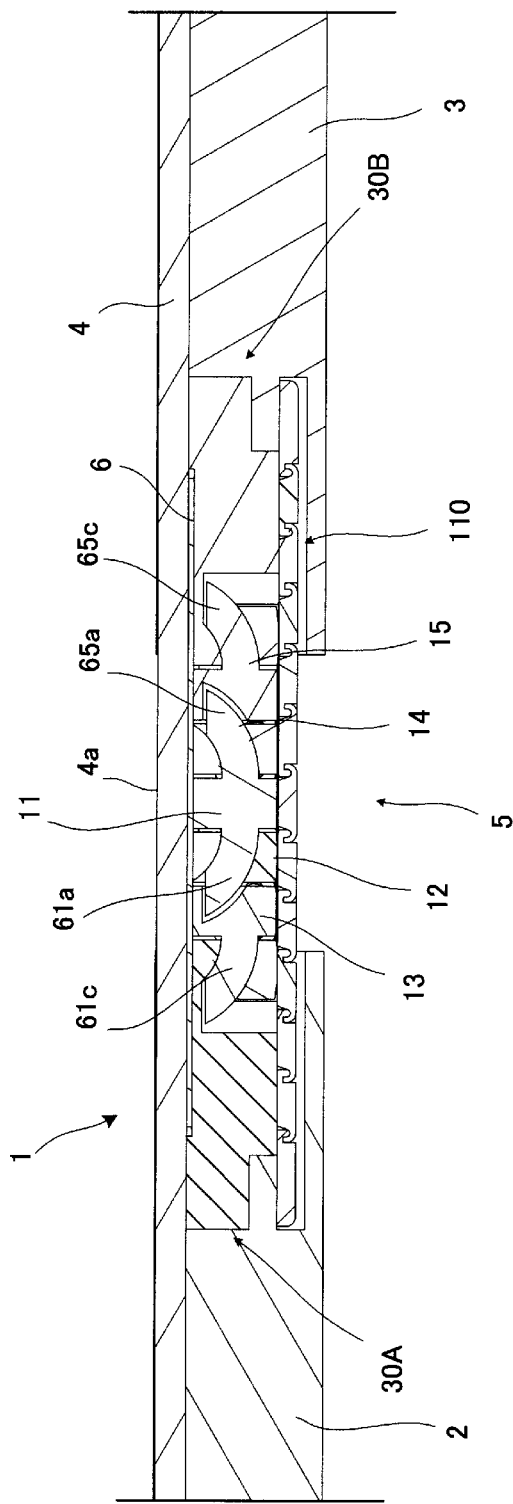
FIG. 30 shows a cross section of an electronic device in an opened state as shown in FIG. 2, along its folding direction, further corresponding to a cross section of an articulated hinge device in a closed state as shown in FIG. 9.

FIG. 30 shows a cross section of the electronic device 1 in the opened state shown in FIG. 2, along its folding direction, further corresponding to a cross section of the articulated hinge device 5 as shown in FIG. 9. The back side cover portion 110 is held to be flat, and the left end vertical cover plate 113A and the right end vertical cover plate 113B reach the ends in the right and left direction of the first base frame 30A and the second base frame 30B.

Figure 14:
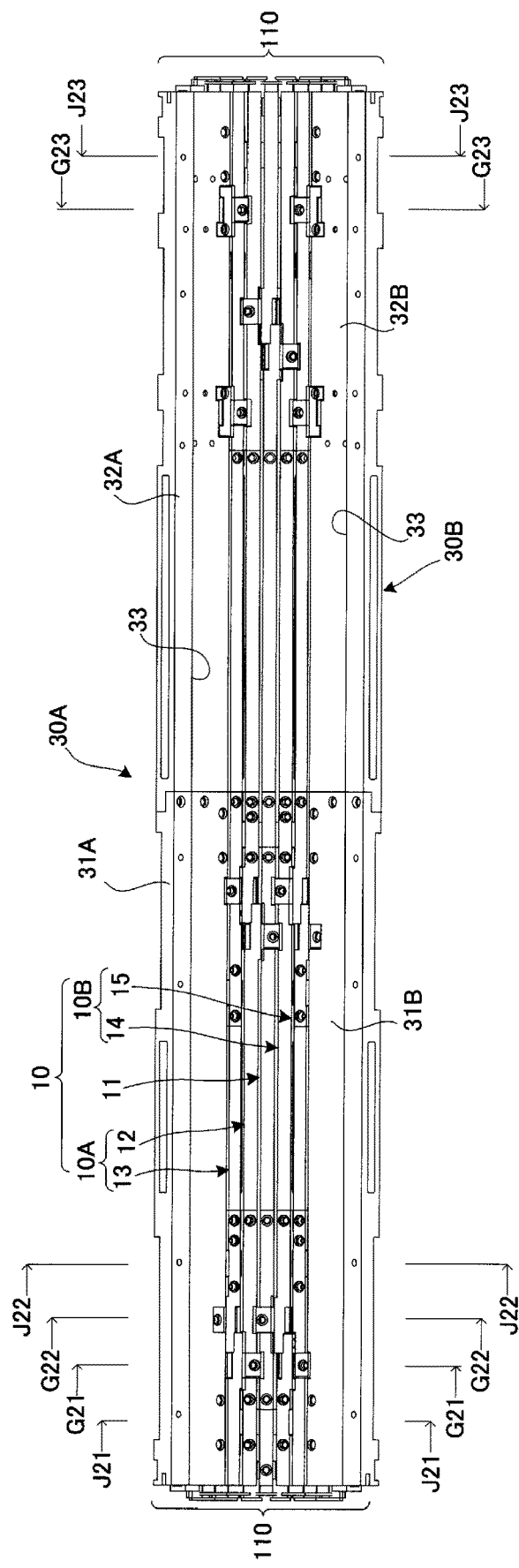
FIG. 14 shows a top view of an articulated hinge device in the open position shown in FIG. 5A, with a support sheet being removed, in particular an intermediate state lying between an opened state and a closed state.
Figure 15:
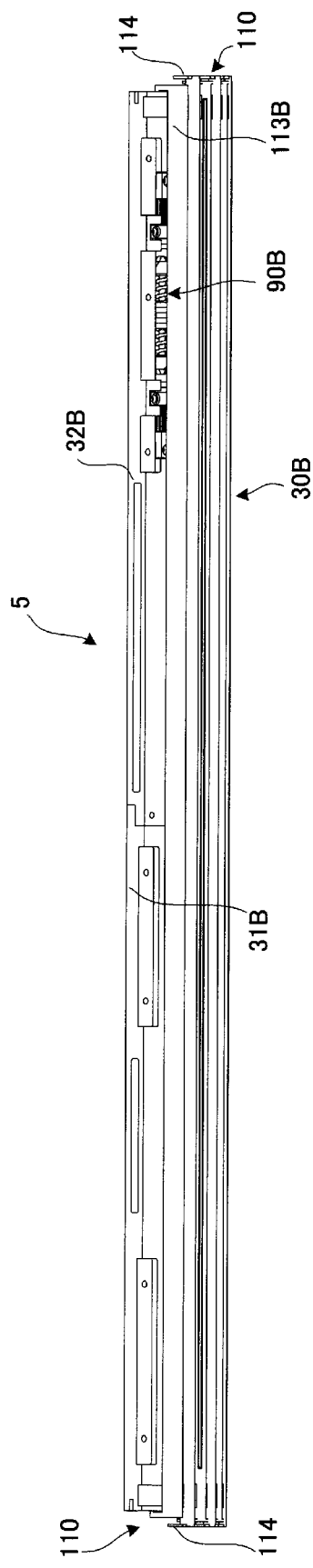
FIG. 15 shows an elevation view of an articulated hinge device in an intermediate state as shown in FIG. 14.

FIG. 14 shows a top view of the articulated hinge device 5, and FIG. 15 is an elevation view of FIG. 14, showing the intermediate opened and closed state lying between the opened state and the closed state. The articulated hinge device 5 shifts from the flat state to the bent state in the intermediate opened and closed state.

In FIG. 14, the first vertical frame 11, the left second vertical frame 12, the left third vertical frame 13 and the first base frame 30A are aligned in the width direction, wherein their lateral surfaces respectively have small gaps. Similarly, the first vertical frame 11, the right second vertical frame 14, the right third vertical frame 15 and the second base frame 30B are aligned in the width direction, wherein their lateral surfaces respectively have small gaps.

Figure 16:
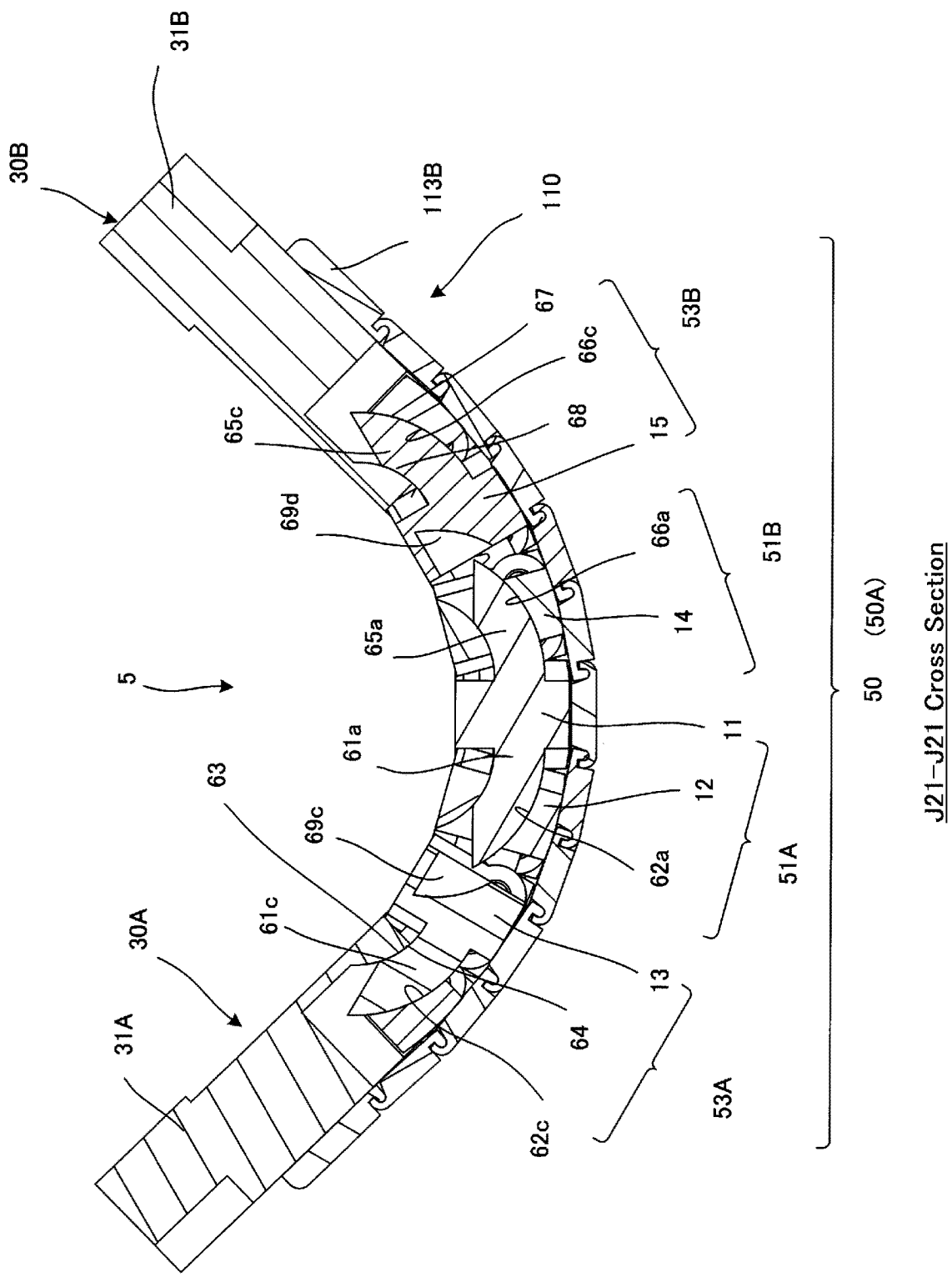
FIG. 16 shows a cross section in line J21-J21 in FIG. 14.
Figure 17:
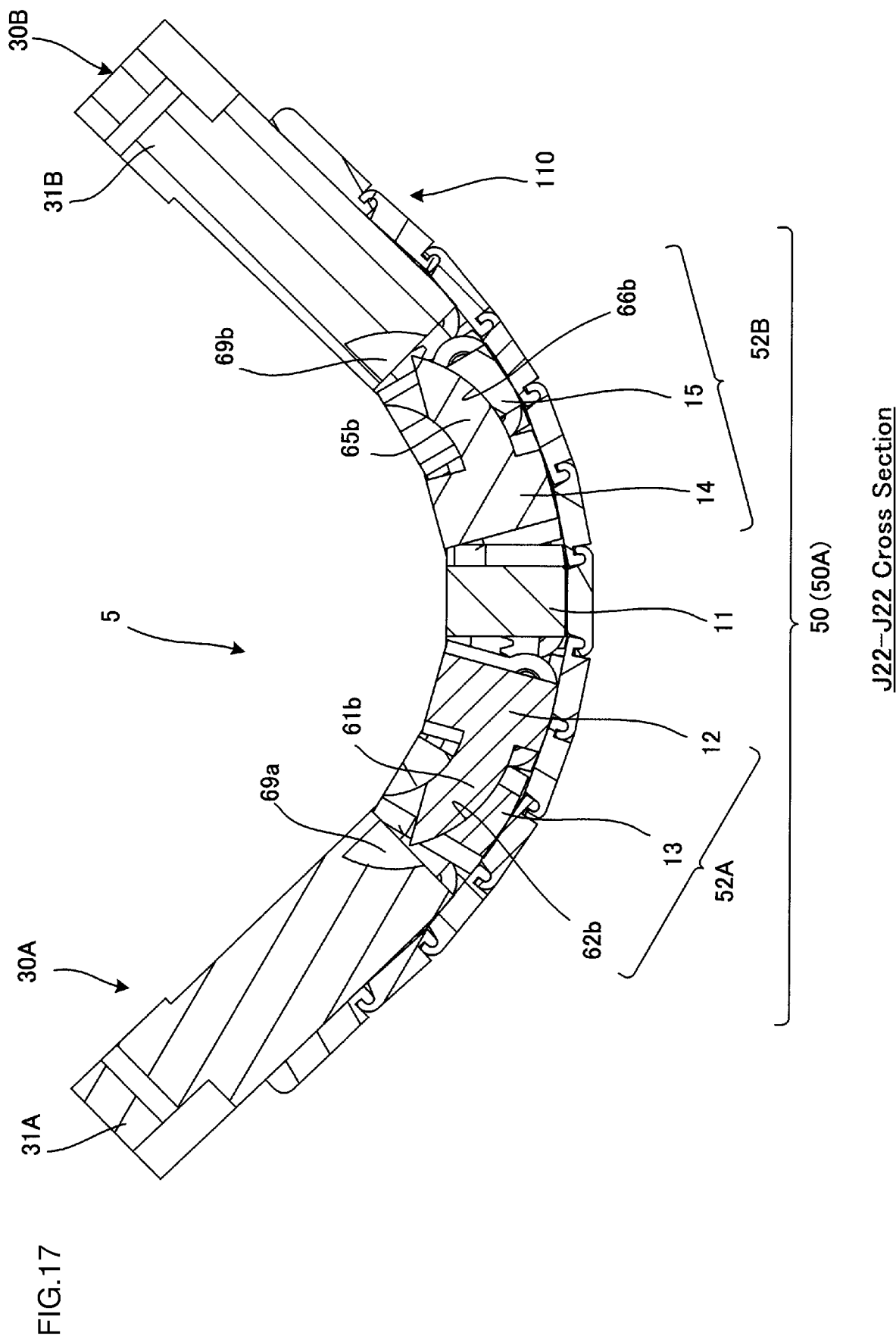
FIG. 17 shows a cross section in line J22-J22 in FIG. 14.
Figure 18:
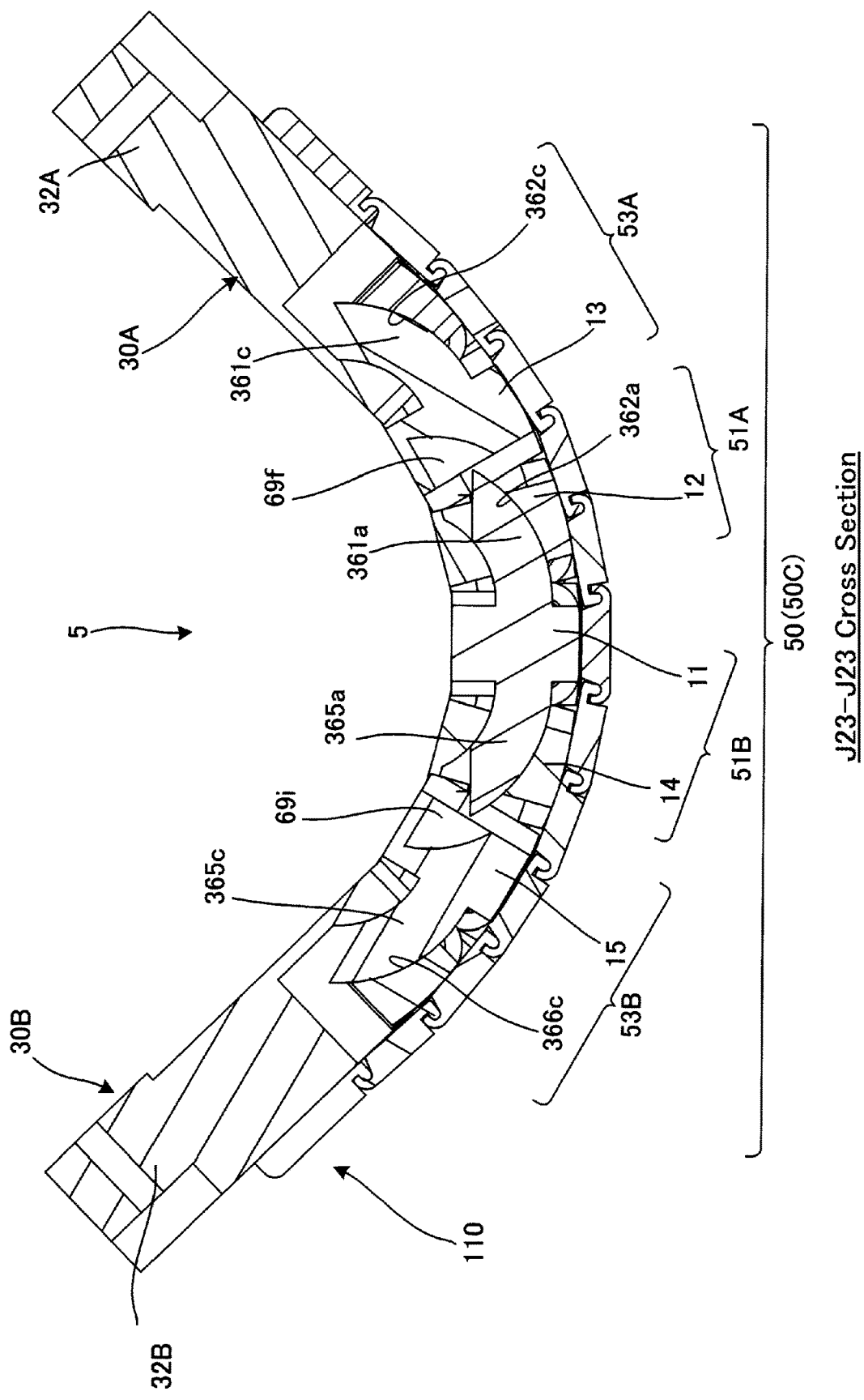
FIG. 18 shows a cross section in line J23-J23 in FIG. 14.
Figure 19:
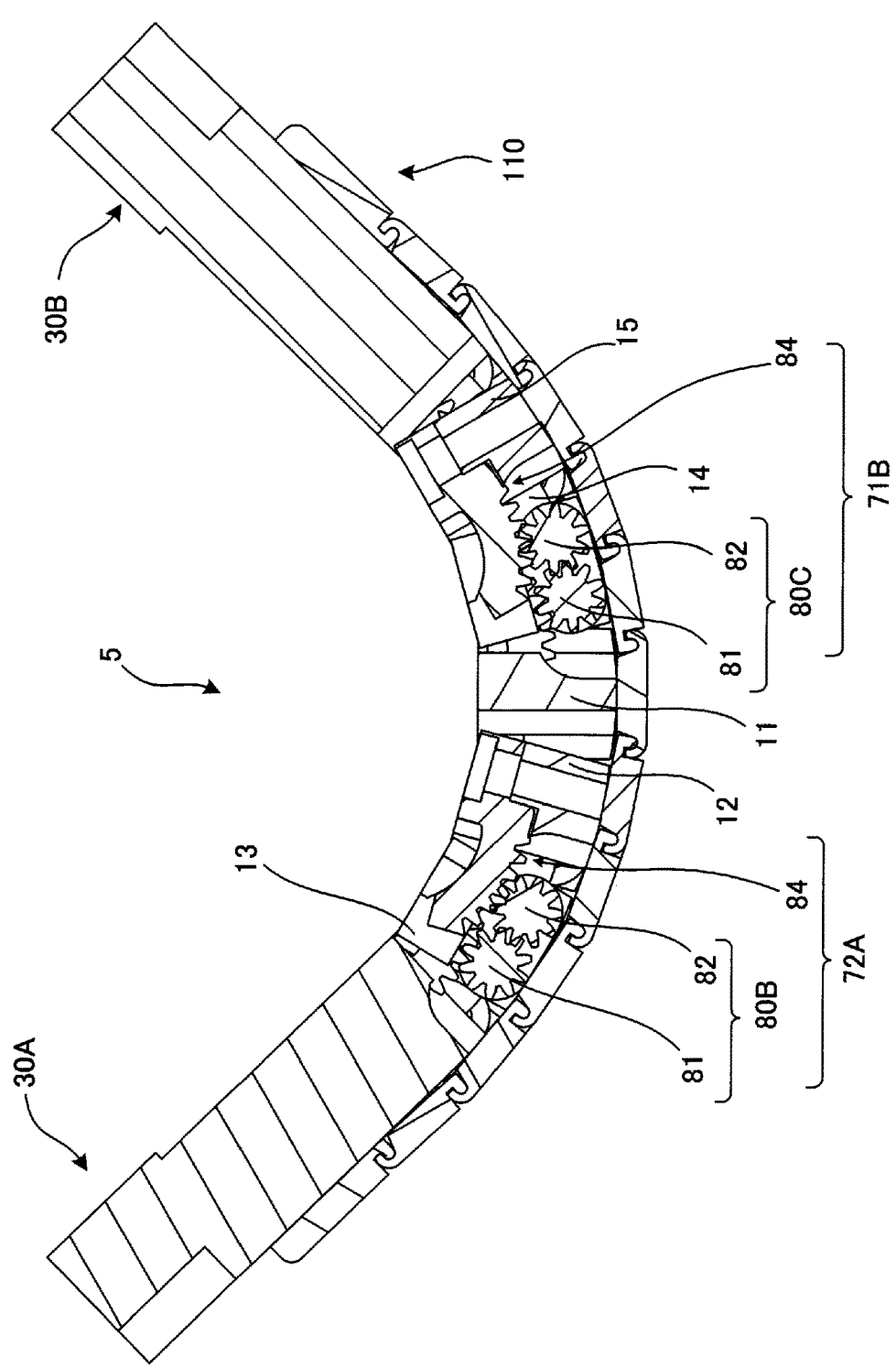
FIG. 19 shows a cross section in line G21-G21 in FIG. 14.
Figure 20:
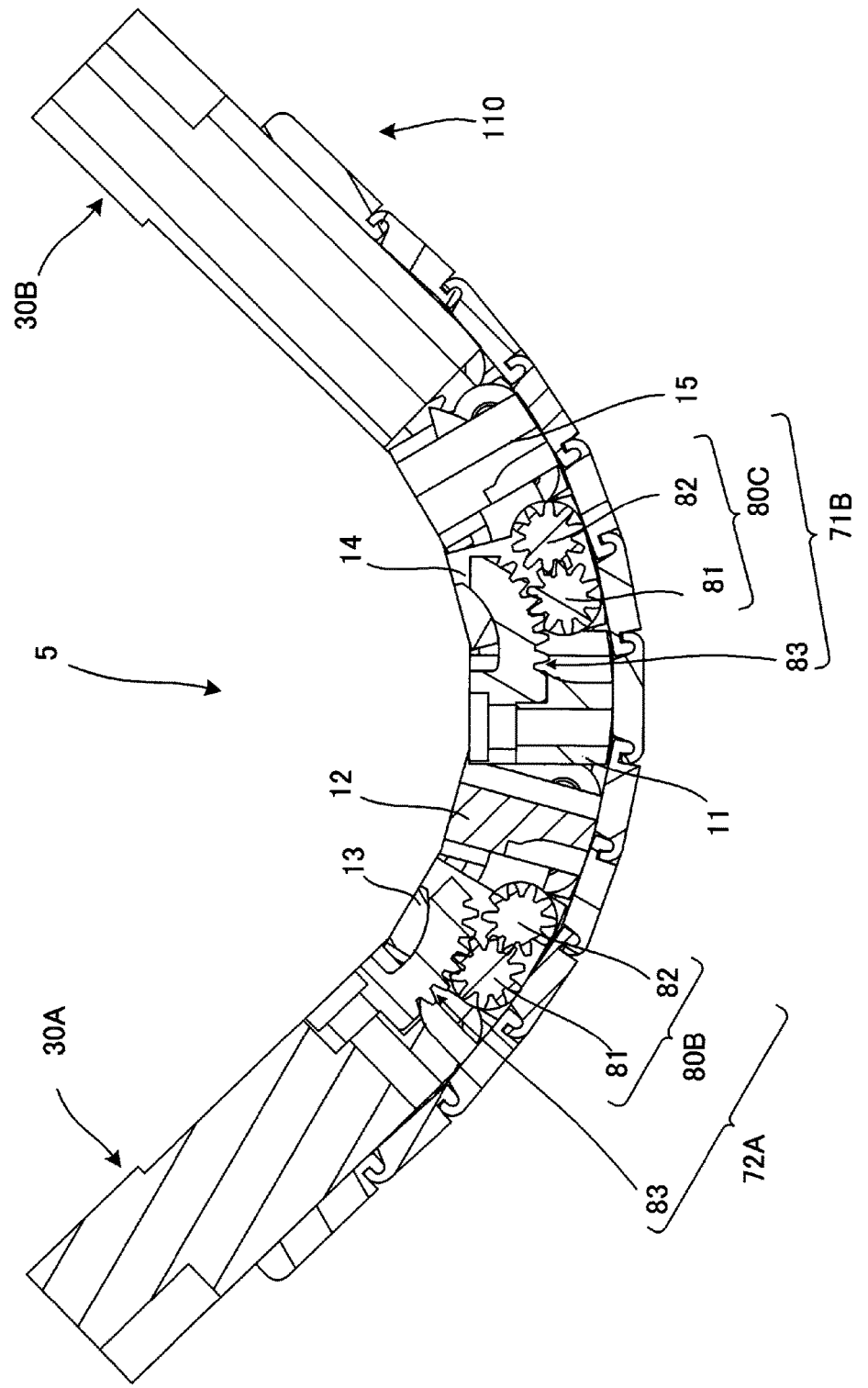
FIG. 20 shows a cross section in line G22-G22 in FIG. 14.
Figure 21:
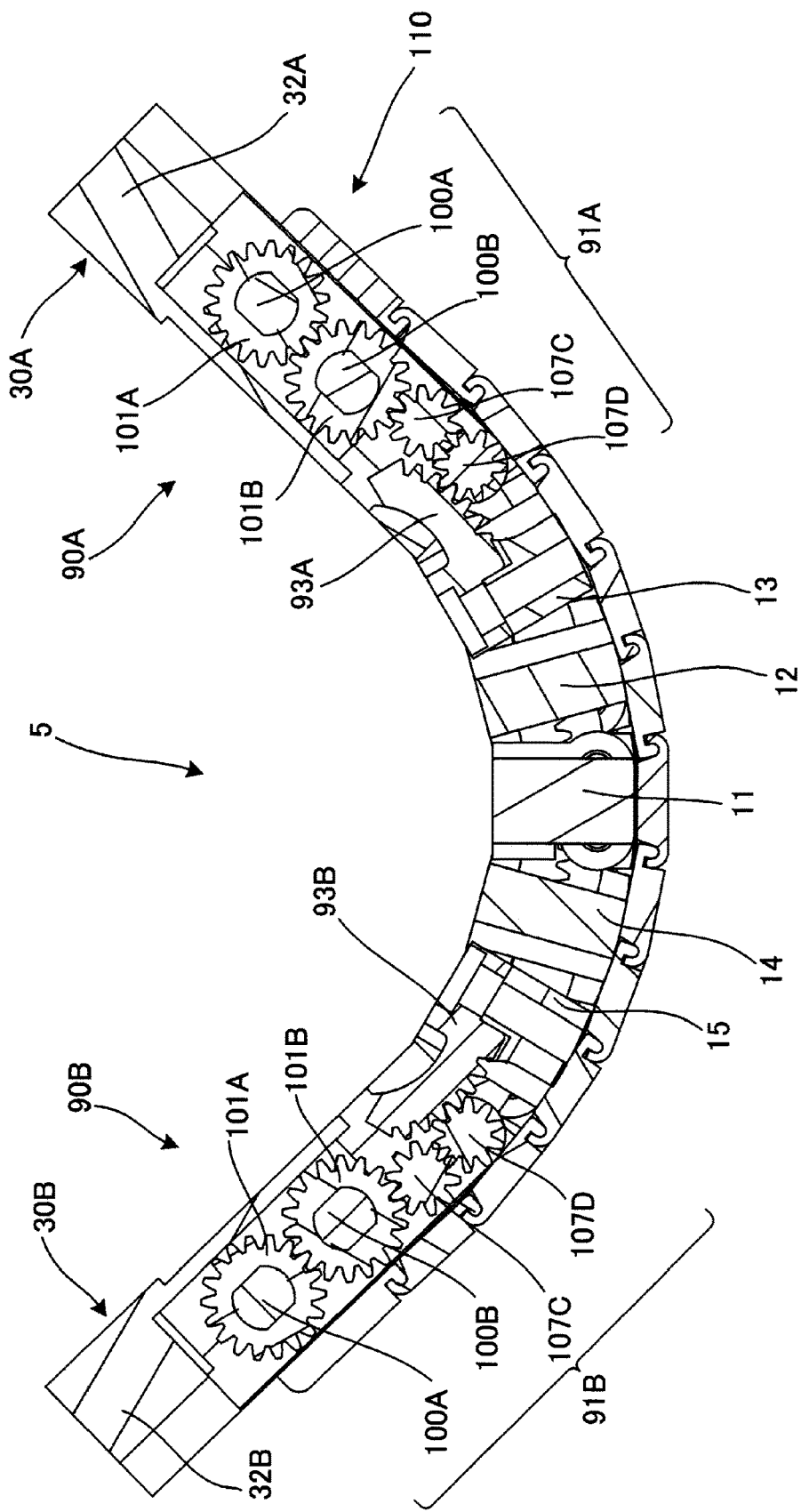
FIG. 21 shows a cross section in line G23-G23 in FIG. 14.

In FIG. 14, the cross section taken in arrows J21-J21 (which is the same cross section area as the cross section taken in arrows J11-J11 in FIG. 9), which shows the articulated portions 50 is shown in FIG. 16, and the cross section taken in arrows J22-J22 (which is the same cross section area as the cross section taken in arrows J12-J12) in FIG. 17. The cross section taken in arrows J23-J23, which shows the third row articulated portion 50C is shown in FIG. 18. The one in G21-G21 cross section area (which is the same cross section area as the cross section taken in arrows G11-G11 in FIG. 11) is shown in FIG. 19, while the one in G22-G22 cross section area (which is the same cross section area as the cross section taken in arrows G12-G12 in FIG. 12) is shown in FIG. 20 and the one in G23-G23 cross section area (which is the same cross section area as the cross section taken in arrows G13-G13 in FIG. 13) is shown in FIG. 21.

Though the left first synchronous gear train 71A and the right second synchronous gear train 72B are not shown in FIG. 11 and FIG. 12 (FIG. 20, FIG. 21, FIG. 27 and FIG. 28), reference is now made to FIG. 16 to FIG. 21, while the meshed state of the left first synchronous gear train 71A and the right second synchronous gear train 72B is additionally described in reference to FIG. 5B.

As shown in FIG. 16, FIG. 17 and FIG. 18, when the first base frame 30A and the second base frame 30B are turned from the opened state in the closing direction, in the first base frame 30A, the left third guide hole portion 62c (362c) provided on the first base frame 30A is turned, while it shifts toward the left in the drawings along the trajectory described by the curved surface 63 of the left third arc-shaped arms 61c (361c) and changes its orientation upward. Furthermore, the right third guide hole portion 66c (366c) provided on the second base frame 30B is turned, while it shifts toward the right in the drawings along the trajectory described by the curved surface 67 of the right third arc-shaped arms 65c (365c) and changes its orientation upward. Therefore, the gap between the first base frame 30A and the left third vertical frame 13 are wider, and the gap between the right third vertical frame 15 and the second base frame 30B are wider. In FIG. 18 the third row articulated portion 50C has a structure identical to the first row articulated portion 50A, and behaves in the same manner as the latter.

In FIG. 17, the left second articulation joints 52A is configured to ensure that the left second guide hole portion 62b provided on the left third vertical frame 13 is engaged with an area almost in the middle of the left second arc-shaped arm 61b provided on the left second vertical frame 12. Furthermore, the right second articulation joint 52B is configured to ensure that the right second guide hole portion 66b provided on the right third vertical frame 15 is engaged with an area almost in the middle of the right second arc-shaped arm 65b provided on the right second vertical frame 14.

As the positions of the respective frames (11 to 15, 30A and 30B) in FIG. 16 are compared to those in FIG. 9, the frames (12 to 15, 30A and 30B) arranged on the right and left in the width direction, centering around the first vertical frame 11 turns the same angle and open the gaps to the same stroke. Therefore, based on the first vertical frame 11, the turning angle of the first base frame 30A is the sum of the turning angle of the left second vertical frame 12, the turning angle of the left third vertical frame 13 and the turning angle of the first base frame 30A. This also applies to the second base frame 30B. Moreover, as the shift trajectories by the slide engagements of the respective arc-shaped arms and the respective guide hole portions form a single parabola, the front surfaces of the respective vertical frames 11 to 15 of the frame portion 10 and of the first and the second base frames 30A, 30B assure the arc shape of small curvature at the intermediate opening and closing position.

Therefore, the freely deformable portion 4a of the flexible display sheet 4 is held following the curved surface formed by the respective frames 11 to 15 of the frame portion 10 and by the first and the second base frames 30A, 30B. Moreover, in the back side cover portion 110, the engagement position of the left end vertical cover plate 113A and the right end vertical cover plate 113B relative to the first base frame 30A and the second base frame 30B shift toward the inner side along the width direction.

Reference is made to the operation of the synchronous driving portion 70, based on FIG. 19 and FIG. 20, wherein the respective vertical frames 11 to 15 of the frame portion 10, as well as the first base frame 30A and the second base frame 30B are all driven in a synchronous manner, the curved surface formed by the front surfaces of the respective vertical frames 11 to 15, as well as of the first base frame 30A and of the second base frame 30B is a parabola.

As shown in FIG. 20, the left second synchronous gear train 72A is configured to ensure that the turning motion of the first arc-shaped gear 83 fixed to the first base frame 30A turning clockwise enables left synchronous gear 81 of the left second synchronous gear portion 80B to be rotated counterclockwise, and the right synchronous gear 82 to be rotated clockwise. In FIG. 19, during a clockwise rotation of the right synchronous gear 82 of the left second synchronous gear portion 80B, the right synchronous gear 82 turns around on its own axis and shifts its meshing position with the second arc-shaped gear 84 toward the tip portion. Therefore, the left second vertical frame 13 turns clockwise and shifts to open the gap with the left second vertical frame 12, as shown in FIG. 16.

The left first synchronous gear train 71A is configured to ensure that the base portion of the first arc-shaped gear 83 fixed to the left third vertical frame 13 is meshed with the left synchronous gear 81 of the left first synchronous gear portion 80A provided on the left second vertical frame 12. The second arc-shaped gear 84 fixed to the first vertical frame 11 is meshed at its base portion with the right synchronous gear 82 of the left first synchronous gear portion 80A. Therefore, when the left third vertical frame 13 turns clockwise by the operation from the opened state to the closed state, the meshed position of the first arc-shaped gear 83 with the left synchronous gear 81 shifts from the base portion to the tip portion to force the left synchronous gear 81 to be rotated counterclockwise. Then, the right synchronous gear 82 meshed with the left synchronous gear 81 is rotated clockwise. Here, the right synchronous gear 82 turns around clockwise on its own axis and shifts its meshing position with the second arc-shaped gear 84 from the base portion to the tip portion. Therefore, the left second vertical frame 12 turns clockwise and shifts relative to the first vertical frame 11.

In other words, when the first base frame 30A turns clockwise in the closing direction, with the first vertical frame 11 as a reference point, the left first synchronous gear train 71A forces the left and the right synchronous gears 81, 82 of the left first synchronous gear portion 80A to turn around on its own axis and to turn clockwise and shift. Therefore, the left second vertical frame 12 having the first synchronous gear portion 80A opens the gap with the first vertical frame 11, while it shifts along the predetermined trajectory.

In this manner, the left first synchronous gear train 71A has an effect of forcing the left second vertical frame 12 having the left first synchronous gear portion 80A to shift relative to the first vertical frame 11 in the direction for opening the gap and of forcing the left third vertical frame 13 to shift relative to the left second vertical frame 12 in the direction for opening the gap.

Moreover, in FIG. 19 and FIG. 20, the left second synchronous gear train 72A forces the left and the right synchronous gears 81, 82 of the left second synchronous gear portion 80B to turn around on its own axis and to turn clockwise and shift, the left third vertical frame 13 having the left second synchronous gear portion 80B opens the gap with the second vertical frame 12, while it shifts along the predetermined trajectory.

On the other hand, in reference to FIG. 5B, the right second synchronous gear train 72B is configured to ensure that the base portion of the first arc-shaped gear 83 fixed to the right second vertical frame 14 is meshed with the left synchronous gear 81 of the right second synchronous gear portion 80D provided on the right third vertical frame 15. The second arc-shaped gear 84 fixed to the second base frame 30B is meshed at its base portion with the right synchronous gear 82 of the right second synchronous gear portion 80D. Therefore, when the second base frame 30B turns counterclockwise to realize a shift from the opened state to the closing operation, the second arc-shaped gear 84 turning counterclockwise displaces its meshed position with the right synchronous gear 82 to force the right synchronous gear 82 to be rotated clockwise. Then, the left synchronous gear 81 meshed with the right synchronous gear 82 is rotated counterclockwise. The right second synchronous gear portion 80D is configured to ensure that the left synchronous gear 81 turning counterclockwise is meshed with the first arc-shaped gear 83 fixed on the right second vertical frame 14 and turns around on its own axis to turn counterclockwise and shift. Therefore, the right third vertical frame 15 opens the gap with the right second vertical frame 14 shifts by turning counterclockwise.

As shown in FIG. 19 and FIG. 20, when the right third vertical frame 15 turns counterclockwise, the right synchronous gear 82 of the right first synchronous gear 80C is rotated clockwise and the left synchronous gear 81 rotates counterclockwise. As shown in FIG. 20, when the left synchronous gear 81 of the right first synchronous gear portion 80C is rotated counterclockwise, the left synchronous gear 81 turns on its own axis to displace its meshed position with the first arc-shaped gear 83 and turns counterclockwise and shifts. Therefore, the right second vertical frame 14 expands the gap with the first vertical frame 11 to turn counterclockwise and shift.

In other words, when the right second synchronous gear train 72B realizes the shift of second base frame 30B from the opened state to the closed state, it expands the gap between the right third vertical frame 15 and the second base frame 30B and forces the right third vertical frame 15 to turn and shift in the direction for expanding the gap with the right second vertical frame 14.

On the other hand, when the second base frame 30B turns counterclockwise and shifts, the second arc-shaped gear 84 of the right first synchronous gear train 71B rotates the right synchronous gear 82 of the right first synchronous gear portion 80C clockwise via the right second synchronous gear train 72B, as shown in FIG. 19. Then, as shown in FIG. 20, the left synchronous gear 81 turns around on its own axis and is meshed with the first arc-shaped gear 83 to turn counterclockwise and shift, so that the right second vertical frame 14 expands its gap with the first vertical frame 11.

FIG. 19 and FIG. 20 show the right first synchronous gear train 71B and the left second synchronous gear train 72A in their intermediate opened and closed state. As the right first synchronous gear train 71B and the left second synchronous gear train 72A in their opened state in FIG. 11 is compared to FIG. 19, the meshed position of the second arc-shaped gear 84 with the right synchronous gear 82 is at its base portion in FIG. 11, while it shifts from its base portion toward its tip portion in FIG. 19. Similarly, as FIG. 20 is compared to FIG. 12, the meshed position of the first arc-shaped gear 83 with the left synchronous gear 81 shifts from its base portion in FIG. 12 toward its tip portion in FIG. 20.

In the intermediate opened and closed state, the first friction click stop portion 90A and the second friction click stop portion 90B are meshed with the fourth input gear 107D in the state, where the rear first coupling gear 93A and the rear second coupling gear 93B have shifted from the base side to the middle position toward the tip portion. The first friction click stop portion 90A and the second friction click stop portion 90B rotates the first driving shaft 100A and the second driving shaft 100B while the right synchronous gears 101B are rotated by the synchronous rotation of the third input gear 107C, and the left synchronous gears 101A meshed with the right synchronous gears 101B are rotated. The rotating friction plates, i.e. first friction plates 103A and the second friction plates 103B are in friction contact with the non-rotatable friction plates, i.e. first common friction plate 102A and the second common friction plate 102B. Therefore, when the first casing 2 and the second casing 3 turn in the closing direction from the opened state to the intermediate opened and closed state, they are under resistive force by friction. Then, the first casing 2 and the second casing 3 stop to close at the intermediate opened and closed state, the shift motion of the synchronous driving portion 70 is locked by friction resistance, and the respective vertical frames 11 to 15, the first base frame 30A and the second base frame 30B are held at the intermediate opened and closed state.

Figure 22:
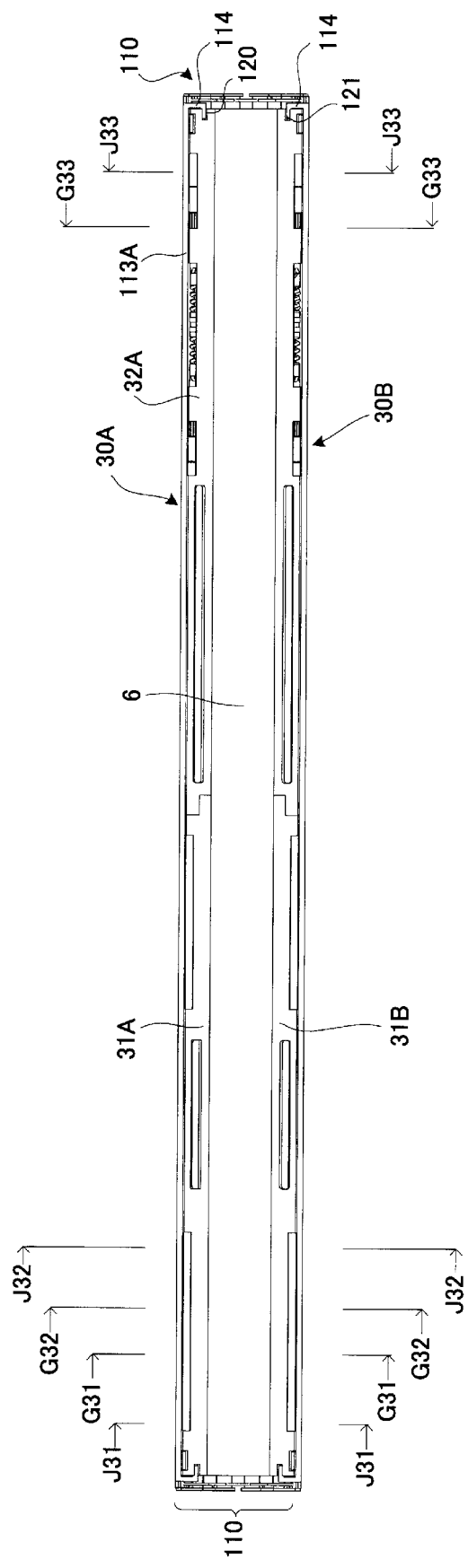
FIG. 22 shows a top view of an articulated hinge device in a closed state shown in FIG. 3, wherein a support sheet is mounted.
Figure 23:
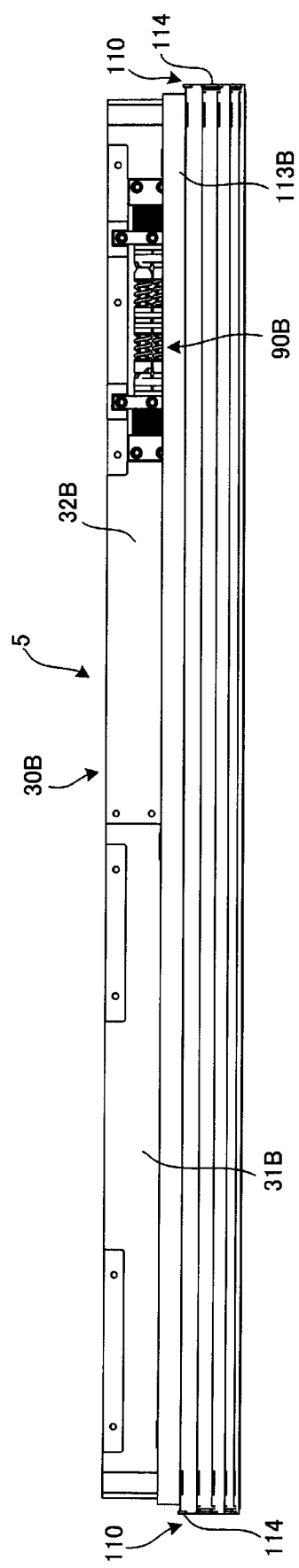
FIG. 23 shows an elevation view of an articulated hinge device in a closed state as shown in FIG. 22.

FIG. 22 shows a top view of the articulated hinge device 5 in the closed state, and FIG. 23—an elevation view of FIG. 22. In FIG. 22, the cross sections showing the articulated portions 50 taken in arrows J31-J31, J32-J32, J33-J33, G31-G31, G32-G32, G33-G33 show the same cross section areas as the cross section taken in arrows J21-J21, J22-J22, J23-J23, G21-G21, G22-G22, G23-G23 in FIG. 14.

Figure 24:
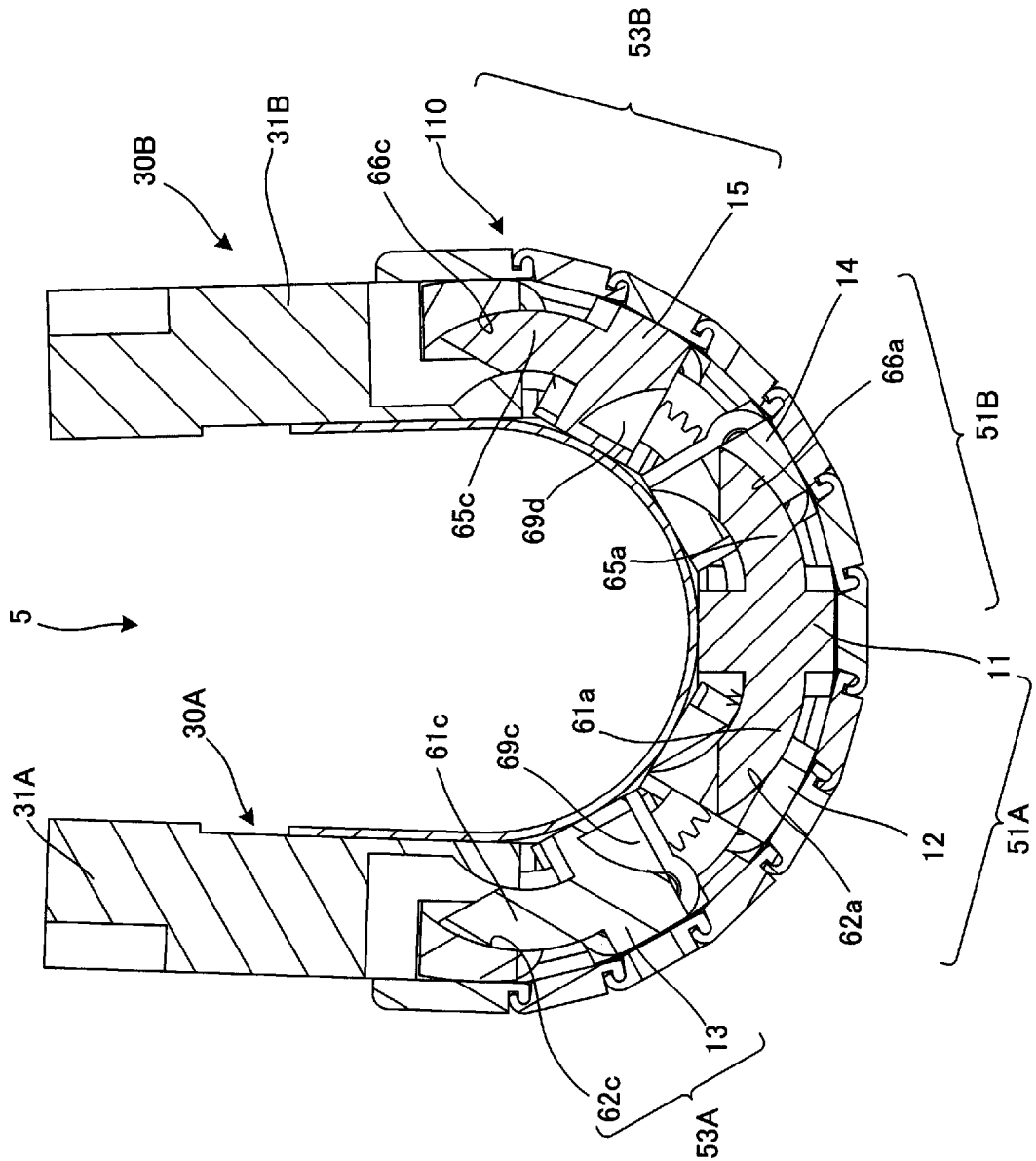
FIG. 24 shows a cross section in line J31-J31 in FIG. 22.
Figure 25:
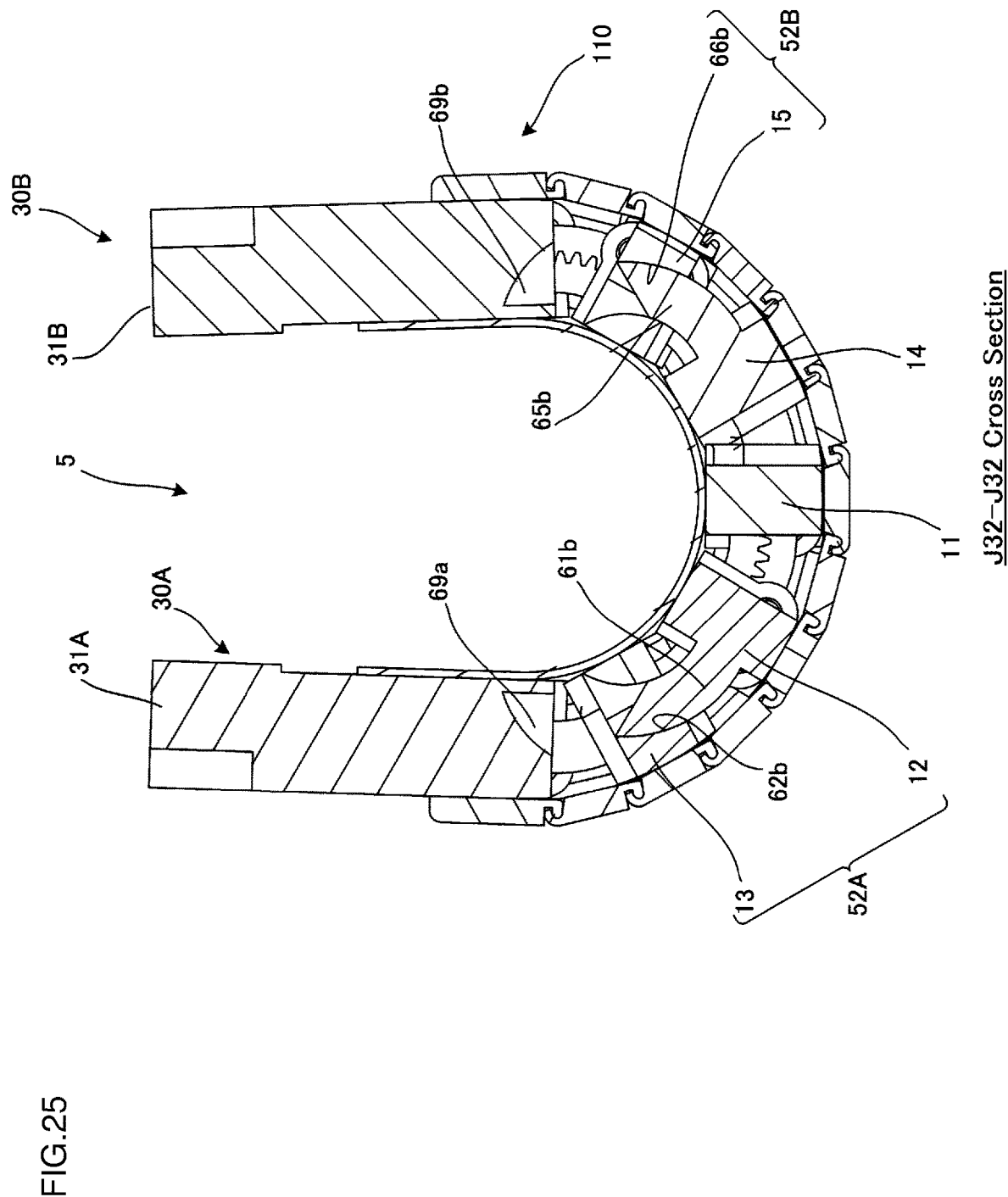
FIG. 25 shows a cross section in line J32-J32 in FIG. 22.
Figure 26:
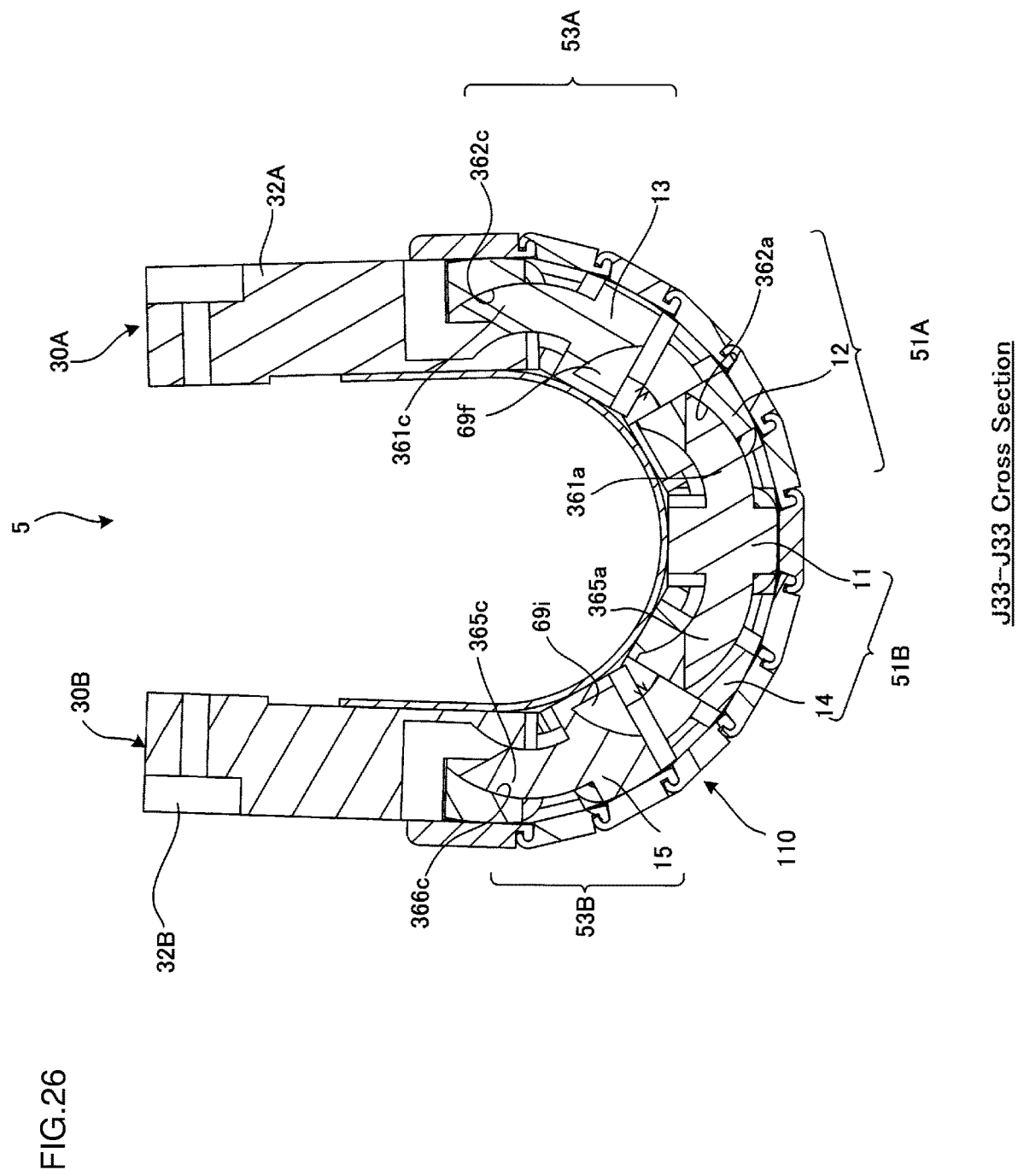
FIG. 26 shows a cross section in line J33-J33 in FIG. 22.

The cross sections taken in arrows in J31-J31 is shown in FIG. 24, while the one in J32-J32 in FIG. 25 and the one in J33-J33 in FIG. 26. In the state where the first base frame 30A and the second base frame 30B are parallel to each other, or in the closed state where the both are closed slightly inward from the parallel state, the left first guide hole portion 62a is engaged with the left first arc-shaped arm 61a at the tip portion of the latter. Similarly, the other guide hole portions 62b, 62c, 66a, 66b, 66c are engaged with the tip portion of the arc-shaped arms 61b, 61c, 65a, 65b, 65c. As compared to FIGS. 16 to 17 showing the intermediate opened and closed state, the guide hole portions engaged with the intermediate portions of the arc-shaped arms further displace their engaging positions toward the tip portion sides, so that the respective vertical frames 11 to 15, the first base frame 30A and the second base frame 30B increase their turning angle to the adjacent frames, expand the gap and shift.

If the first vertical frame 11 is taken as reference point, the sum of the turning angles of the first vertical frame 11, the first base frame 30A, the respective vertical frames 12, 13 between them respectively relative to their adjacent frames is substantially 90 degrees. Furthermore, the sum of the turning angles of the first vertical frame 11, the second base frame 30B, the respective vertical frames 14, 15 between them respectively relative to their adjacent frame is substantially 90 degrees.

Figure 27:
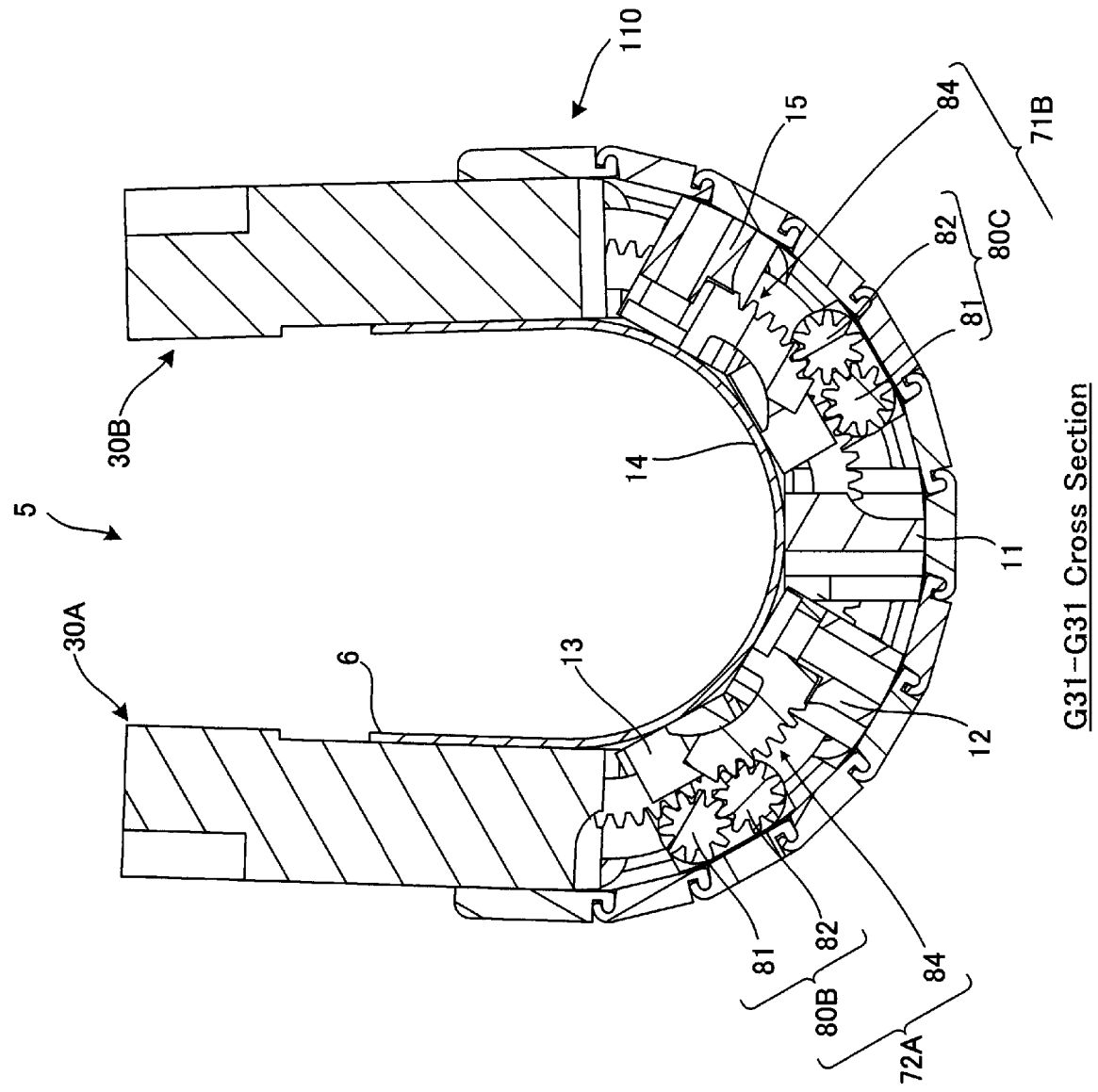
FIG. 27 shows a cross section in line G31-G31 in FIG. 22.
Figure 28:
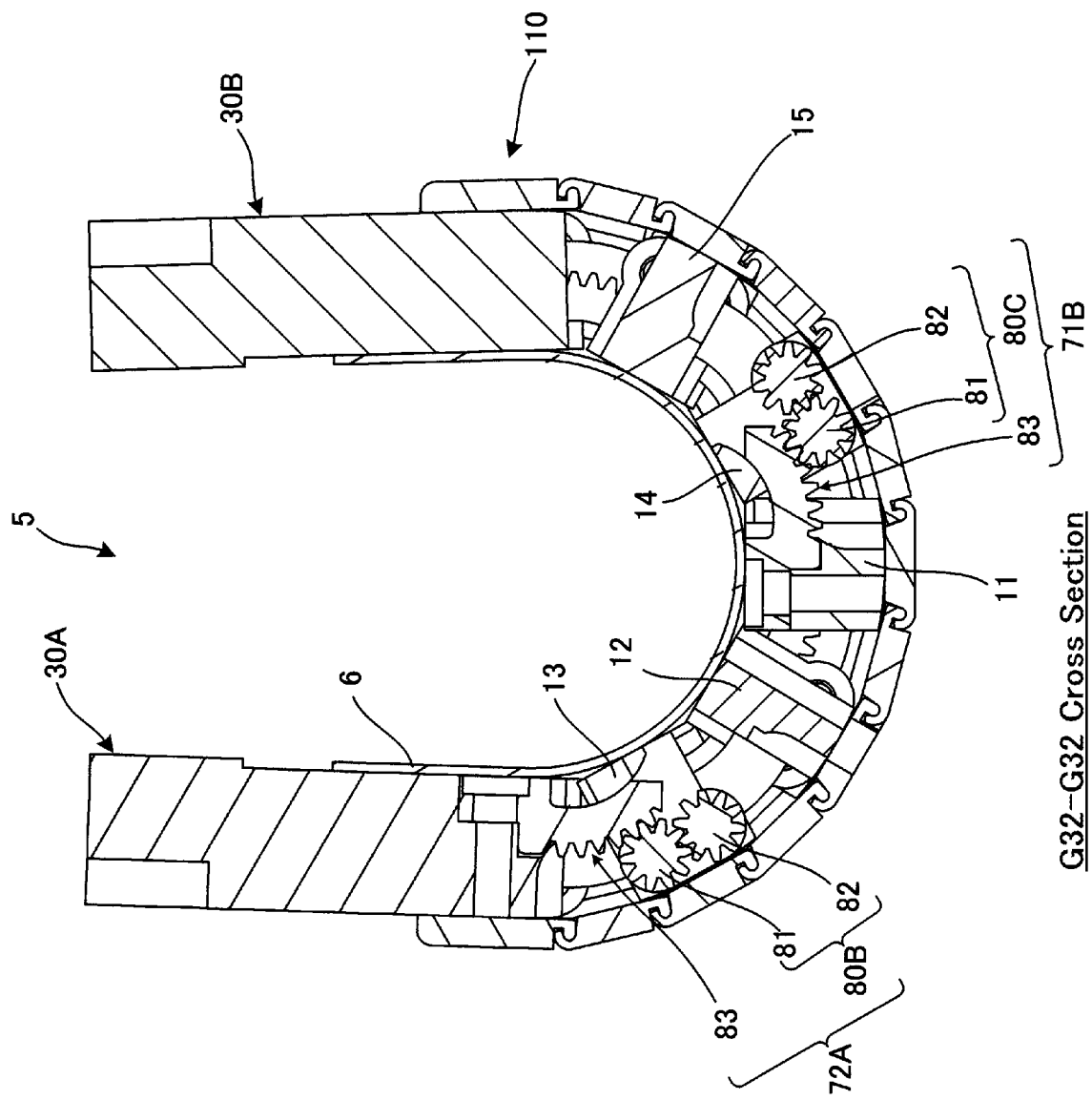
FIG. 28 shows a cross section in line G32-G32 in FIG. 22.

The cross section taken in arrows G31-G31 is shown in FIG. 27, while the one in G32-G32 in FIG. 28. A comparison to the intermediate opened and closed state shown in FIGS. 20 and 21 relates to the meshed position with the left second synchronous gear portion 80B, the first arc-shaped gear 83 and the second arc-shaped gear 84 of the left second synchronous gear train 72A, as well as to the meshed position of the right first synchronous gear portion 80C, the first arc-shaped gear 83 and the second arc-shaped gear 84 of the right first synchronous gear train 71B.

In the closed state, the tip portion of the second arc-shaped gear 84 on the left side in the width direction as seen from the first vertical frame 11 is meshed with the right synchronous gear 82 of the left second synchronous gear portion 80B, while the tip portion of the second arc-shaped gear 84 on the right side in the width direction as seen from the first vertical frame 11 is meshed with the right synchronous gear 81 of the right first synchronous gear portion 80C, as shown in FIG. 27. Moreover, the tip portion of the first arc-shaped gear 83 on the left side in the width direction as seen from the first vertical frame 11 is meshed with the left synchronous gear 81 of the second synchronous gear portion 80B, while the tip portion of the first arc-shaped gear 83 on the right side in the width direction as seen from the first vertical frame 11 with the left synchronous gear 81 of the right first synchronous gear portion 80C, as shown in FIG. 28.

The synchronous driving portion 70 has an effect to displace the meshed position of the first arc-shaped gear 83 with the left synchronous gear 81 from the base portion of the first arc-shaped gear 83 to the tip portion during the shift from the opened state to the closed state, and to displace the meshed position of the second arc-shaped gear 84 with the right synchronous gear 82 from the base portion of the second arc-shaped gear 84 to the tip portion. Moreover, on the contrary, it displaces the meshed position of the first arc-shaped gear 83 with the left synchronous gear 81 from the tip portion of the first arc-shaped gear 83 to the base portion during the shift from the closed state to the opened state, and displaces the meshed position of the second arc-shaped gear 84 with the right synchronous gear 82 from the tip portion of the second arc-shaped gear 84 to the base portion.

The respective vertical frames 11 to 15, the first base frame 30A and the second base frame 30B, as these frames are guided by the articulation joints (51A to 53A, 51B to 53B) of the articulated portions 50, are synchronously driven by the respective synchronous gears (71A, 72A, 71B, 72B) in the direction in which the adjacent frames approach and in the direction in which they come away from each other. Here, the respective frames change the orientation and angle of their rotation relative to each other to change the gap between the frames.

Figure 29:
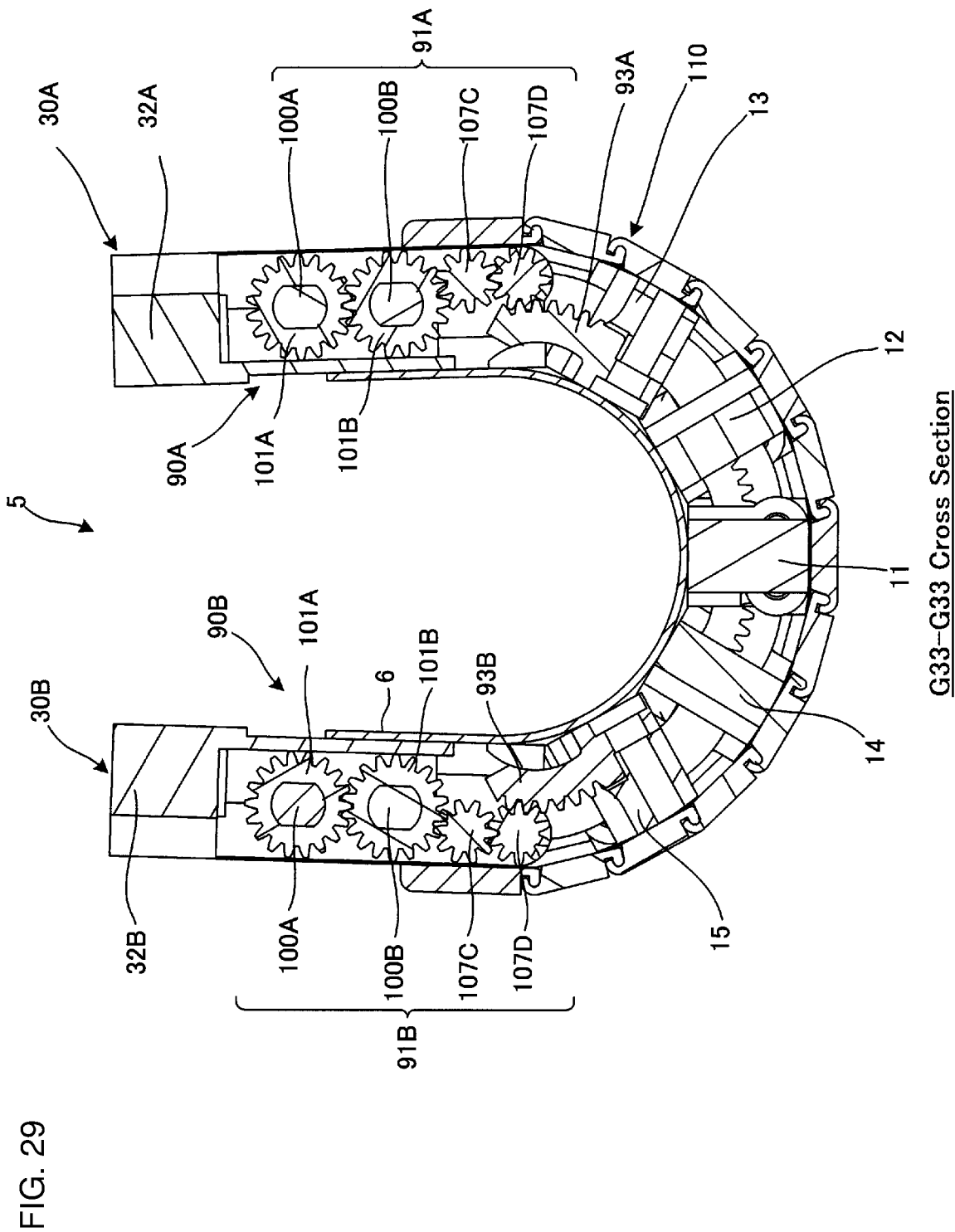
FIG. 29 shows a cross section in line G33-G33 in FIG. 22.

As shown in FIG. 29, in the first friction click stop portion 90A and the second friction click stop portion 90B, the tip portions of the rear first coupling gear 93A and the rear second coupling gear 93B are meshed with the fourth input gear 107D as compared to FIG. 21. Therefore, when the first casing 2 and the second casing 3 turn between the opened state and the closed state, they are under resistive force by friction. Furthermore, in the opened state, a click feeling is obtained by forcing the click projection portions 105b of the click bodies 105 to abut against the tip portions 104d of the left and the right cam portions 104A of the common click plate 104 against the spring force of the compression springs 106. In the closed state, a click feeling is obtained by forcing the click projection portions 105b to be fitted into the concave portions 104c of the cam portions 104A by the spring force of the compression springs 106.

FIG. 31 shows the closed state of the electronic device 1, wherein the first casing 2 and the second casing 3 are folded to face each other, and in the articulated hinge device 5, the front surface of the frame portion 10 composed of the five vertical frames is curved in semi-circular shape. Therefore, the freely deformable portion 4a of the flexible display sheet 4 is held on the front surface of the frame portion 10 in semi-circular shape.

In the embodiment as described above, though reference has been made to the case that the first casing 2 and the second casing 3 are opened and closed at the same time, the articulated hinge device 5 also behaves similarly in case that the first casing 2 only is opened and closed relative to the second casing 3 placed on the desk.

Furthermore, though the frame portion 10 in the embodiment as described above is described based on the example of the single left first frame group 10A and the single right first frame group 10B, a plurality of first frame groups 10A and a plurality of right first frame groups 10B can be provided.

The number of vertical frames of the frame portion 10 is an odd number of five or more, and one or more left first frame group(s) 10A and right first frame group(s) 10B can be respectively provided on the right and left along the width direction of the first vertical frame 11. Therefore, for the number N of vertical frames in the frame portion 10, N can be expressed as N=1+2n, where n is an integer greater than or equal to 2. Articulated portions 50 may be provided at both ends of the vertical direction.

The articulated hinge device can hold the bent part of the flexible display sheet following the frame portion which forms an arc-shaped trajectory when the first casing and second casing are opened and closed. Therefore, the bent part of the flexible display sheet folded in a semicircular arc shape, can be stably held in the closed position without swaying. In addition, no sag or wrinkling occurs when the product is used in an opened state.

The invention is a hinge device suitably used in a folding electronic device, such as smartphone, electronic notebook, PDA, netbook, a video display device, portable game machine and notebook PC, which is built by attaching a flexible display sheet across respective surfaces of a first and a second casings; it can further be suitably used as an electronic device using such a hinge device.

What is claimed is:

1. An articulated hinge device for coupling a first casing and a second casing of an electronic device in a foldable manner by a relative folding motion between an opened position and closed position, said articulated hinge device being arranged on a back side of a flexible display sheet attached over inner surfaces of both said first casing and said second casing, said articulated hinge device comprising:
    a frame portion consisting of an odd number (1+2n, where n is an integer greater than or equal to 2) of vertical frames arranged in parallel along a width direction, a shorter-side direction thereof being said width direction and a longitudinal direction thereof being a vertical direction,
    a first base frame arranged in parallel with a vertical frame at one end of said frame portion in said width direction and attached to said first casing;
    a second base frame arranged in parallel with a vertical frame at the other end of said frame portion in said width direction and attached to said second casing;
    an articulated portion comprising articulation joints respectively arranged between adjacent frames for rotatably displacing adjacent frames along a predetermined trajectory, while changing directions and angles of rotation thereof in a frame row composed of said first base frame and said second base frame, both base frames being parallel to each other on both sides in said width direction of said odd number of vertical frames;
    a synchronous driving portion for coupling said adjacent frames in a frame row in series by gears and for synchronously displacing each of said adjacent frames in a direction away from each other, said first base frame and said second base frame shifting relative to each other in a closed position direction, and synchronously displacing each of said adjacent frames in the direction in which the both move away from each other, said first base frame and said second base frame shifting relative to each other in an opening direction;
    a stop holding portion for stopping said first base frame in a rotation movement thereof relative to said vertical frame adjacent to said first base frame, as well as said second base frame in a rotation movement thereof relative to said vertical frame adjacent to said second base frame, and for holding them between said closed position and said opened position; and
    wherein said synchronous driving portion is configured to ensure that a plurality of synchronous gear trains are provided along said width direction, wherein three adjacent frames in parallel are coupled as one group by gears in series, and said synchronous gear trains adjacent along said width direction share said two adjacent frames close to the adjacent synchronous gear train among three gears which make up one group.

2. The articulated hinge device according to claim 1, wherein each of said articulation joints is composed of an arc-shaped arm provided on one adjacent frame with a guide surface being a predetermined curved surface and of a guide hole portion provided on the other adjacent frame in said frame for sliding relative to said one adjacent frame along said guide surface of said arc-shaped arm to be engaged with said adjacent frame.

3. The articulated hinge device according to claim 1, wherein one or more frame group(s) is/are arranged symmetrically on the right and the left, wherein each group is made up with a second vertical frame and a third vertical frame aligned on both sides in order from a first vertical frame, and two articulated portions are provided at both ends of said frame section in the vertical direction, or three articulated portions at both ends and the center of the frame section in the vertical direction.

4. The articulated hinge device according to claim 3, wherein articulation joints of said articulated portions comprise articulation joints on the left side in said width direction respectively provided between said first vertical frame and said first base frame, and articulation joints on the right side in said width direction respectively provided between said first vertical frame and said second base frame,
    wherein said articulation joints on the left side in said width direction are configured to ensure that said arc-shaped arms respectively project from said first vertical frame, said second and said vertical frames toward the first base frame side, and each of said guide hole portions is provided on said second and third vertical frames and said first base frame corresponding to each of said arc-shaped arm portions, and
    said articulation joints on the right side of said width direction can be configured to ensure that said arc-shaped arms protrude respectively from said first vertical frame, said second and said third vertical frame toward said second base frame side, and each of said guide hole portions is provided on said second vertical frame, said third vertical frame and said second base frame corresponding to each of said arc-shaped arm portions.

5. The articulated hinge device according to claim 1, wherein said synchronous gear train is configured to ensure that a meshing position of a first arc-shaped arm with a left synchronous gear and a meshing position of a right synchronous gear with a second arc-shaped arm shift from a base portion to a tip portion side during the folding motion from the open to the closed position and from a tip portion side to a base portion side during said folding motion from said closed position to said opened position.

6. The articulated hinge device according to claim 3, wherein said articulated hinge device configured to ensure that an insertion hole is provided on said third vertical frame, wherein a tip portion of an arc-shaped arm penetrating through a guide hole portion provided on said second vertical frame adjacent to said first vertical frame side is inserted into said insertion hole, and insertion holes are provided on the first and second base frames, wherein tip portions of arc-shaped arms penetrating through a guide hole portion provided on the third vertical frame adjacent to the second vertical frame side are inserted into said insertion holes.

7. The articulated hinge device according to claim 1, wherein said articulated hinge device is configured to ensure that a plurality of articulation joints provided between said first vertical frame and said first base frame are arranged with articulation joints adjacent to each other in the width direction shifting from each other in said vertical direction, and a plurality of articulation joints provided between said first vertical frame and said second base frame are arranged with articulation joints adjacent to each other in said width direction shifting from each other in the vertical direction.

8. An articulated hinge device for coupling a first casing and a second casing of an electronic device in a foldable manner by a relative folding motion between an opened position and closed position, said articulated hinge device being arranged on a back side of a flexible display sheet attached over inner surfaces of both said first casing and said second casing, said articulated hinge device comprising:
a frame portion consisting of an odd number (1+2n, where n is an integer greater than or equal to 2) of vertical frames arranged in parallel along a width direction, a shorter-side direction thereof being said width direction and a longitudinal direction thereof being a vertical direction,
a first base frame arranged in parallel with a vertical frame at one end of said frame portion in said width direction and attached to said first casing;
a second base frame arranged in parallel with a vertical frame at the other end of said frame portion in said width direction and attached to said second casing;
an articulated portion comprising articulation joints respectively arranged between adjacent frames for rotatably displacing adjacent frames along a predetermined trajectory, while changing directions and angles of rotation thereof in a frame row composed of said first base frame and said second base frame, both base frames being parallel to each other on both sides in said width direction of said odd number of vertical frames;
a synchronous driving portion for coupling said adjacent frames in a frame row in series by gears and for synchronously displacing each of said adjacent frames in a direction away from each other, said first base frame and said second base frame shifting relative to each other in a closed position direction, and synchronously displacing each of said adjacent frames in the direction in which the both move away from each other, said first base frame and said second base frame shifting relative to each other in an opening direction;
a stop holding portion for stopping said first base frame in a rotation movement thereof relative to said vertical frame adjacent to said first base frame, as well as said second base frame in a rotation movement thereof relative to said vertical frame adjacent to said second base frame, and for holding them between said closed position and said opened position; and
wherein the articulated hinge device is configured to ensure that said stop holding portion comprises a first friction click stop mechanism provided on the first base frame having a first input gear, a second friction click stop mechanism provided on said second base frame having a second input gear, a first coupling gear fixed to a vertical frame adjacent to a second base frame and meshed with said first input gear, and a second coupling gear fixed to a vertical frame adjacent to a second base frame and meshed with said second input gear, and
wherein said first and said second friction click stop mechanisms comprise a cam portion having a corrugated portion, wherein click bodies respectively fixed to rotary shafts of said first and said second input gear portions rotate integrally with each of said rotary shafts and click to engage at the open and closed positions, and friction plates for giving a friction force on said rotation of said rotary shaft.

9. An articulated hinge device for coupling a first casing and a second casing of an electronic device in a foldable manner by a relative folding motion between an opened position and closed position, said articulated hinge device being arranged on a back side of a flexible display sheet attached over inner surfaces of both said first casing and said second casing, said articulated hinge device comprising:
a frame portion consisting of an odd number (1+2n, where n is an integer greater than or equal to 2) of vertical frames arranged in parallel along a width direction, a shorter-side direction thereof being said width direction and a longitudinal direction thereof being a vertical direction,
a first base frame arranged in parallel with a vertical frame at one end of said frame portion in said width direction and attached to said first casing;
a second base frame arranged in parallel with a vertical frame at the other end of said frame portion in said width direction and attached to said second casing;
an articulated portion comprising articulation joints respectively arranged between adjacent frames for rotatably displacing adjacent frames along a predetermined trajectory, while changing directions and angles of rotation thereof in a frame row composed of said first base frame and said second base frame, both base frames being parallel to each other on both sides in said width direction of said odd number of vertical frames;
a synchronous driving portion for coupling said adjacent frames in a frame row in series by gears and for synchronously displacing each of said adjacent frames in a direction away from each other, said first base frame and said second base frame shifting relative to each other in a closed position direction, and synchronously displacing each of said adjacent frames in the direction in which the both move away from each other, said first base frame and said second base frame shifting relative to each other in an opening direction;
a stop holding portion for stopping said first base frame in a rotation movement thereof relative to said vertical frame adjacent to said first base frame, as well as said second base frame in a rotation movement thereof relative to said vertical frame adjacent to said second base frame, and for holding them between said closed position and said opened position; and
wherein said articulated hinge device is configured to ensure that a back side cover portion covering a frame portion is provided on a back side of said frame portion, wherein the back side cover portion has a plurality of vertical cover plates formed in the shape of vertical strips, aligned along the width direction and rotatably coupled to each other around a vertical axis, wherein said vertical cover plate at one end in said width direction among the plurality of vertical cover plates is engaged with said first base plate to be shiftable in the width direction relative to the first base plate, while said cover plate at the other end of said width direction is engaged with said second base frame to be movable in the width direction relative to said second base frame.

* * * * *